United States Patent
Dong et al.

(10) Patent No.: US 11,109,211 B2
(45) Date of Patent: Aug. 31, 2021

(54) METHOD AND DEVICE FOR SUPPORTING PUBLIC SAFETY NET ACCESS IN WIRELESS COMMUNICATION SYSTEM

(71) Applicant: Samsung Electronics Co., Ltd., Suwon-si (KR)

(72) Inventors: Jeongsik Dong, Yongin-si (KR); Junhyuk Song, Anyang-si (KR); Daejoong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 15/774,508

(22) PCT Filed: Nov. 21, 2016

(86) PCT No.: PCT/KR2016/013422
§ 371 (c)(1),
(2) Date: May 8, 2018

(87) PCT Pub. No.: WO2017/086761
PCT Pub. Date: May 26, 2017

(65) Prior Publication Data
US 2020/0252778 A1   Aug. 6, 2020

(30) Foreign Application Priority Data
Nov. 19, 2015   (KR) ........................ 10-2015-0162467

(51) Int. Cl.
*H04W 4/06*   (2009.01)
*H04W 4/90*   (2018.01)
(Continued)

(52) U.S. Cl.
CPC ......... *H04W 4/90* (2018.02); *H04M 1/72418* (2021.01); *H04W 4/06* (2013.01);
(Continued)

(58) Field of Classification Search
CPC .......................... H04M 1/72536; G06F 9/445
(Continued)

(56) References Cited

U.S. PATENT DOCUMENTS 7,623,447 B1   11/2009   Faccin et al.
7,924,871 B2   4/2011   Hyslop
(Continued)

FOREIGN PATENT DOCUMENTS

CN   1929682 A   3/2007
CN   1941937 A   4/2007
(Continued)

OTHER PUBLICATIONS

Extended European Search Report dated Aug. 10, 2018, issued in the European patent application No. 16866713.
(Continued)

*Primary Examiner* — Hai V Nguyen
(74) *Attorney, Agent, or Firm* — Jefferson IP Law, LLP

(57) ABSTRACT

The present invention relates to a method and a device for supporting a public safety network access in a wireless communication system. The method for supporting a public safety network access in a wireless communication system of the present invention comprises the steps of: transmitting a message comprising public safety net related information to a base station; determining whether a handover command is received from the base station in response to the message; and performing a handover at a frequency band which supports public safety network services.

15 Claims, 28 Drawing Sheets

(51) Int. Cl.
*H04W 36/00* (2009.01)
*H04W 72/04* (2009.01)
*H04M 1/72418* (2021.01)
*G06F 9/445* (2018.01)

(52) U.S. Cl.
CPC ..... *H04W 36/0005* (2013.01); *H04W 72/048* (2013.01); *G06F 9/445* (2013.01)

(58) Field of Classification Search
USPC .......................................................... 455/3.1
See application file for complete search history.

(56) References Cited

U.S. PATENT DOCUMENTS

| | | | |
|---|---|---|---|
| 8,131,253 B2* | 3/2012 | Kang | H04W 4/90 455/404.1 |
| 8,279,786 B1 | 10/2012 | Smith et al. | |
| 8,514,747 B2* | 8/2013 | Youn | H04W 72/1242 370/259 |
| 9,052,999 B1 | 6/2015 | Ray et al. | |
| 9,485,109 B2* | 11/2016 | Bao | H04L 12/189 |
| 9,655,131 B2* | 5/2017 | Lee | H04L 5/0062 |
| 9,775,077 B2* | 9/2017 | Yang | H04W 36/0072 |
| 9,775,134 B2* | 9/2017 | Papasakellariou | H04W 72/005 |
| 9,781,649 B2* | 10/2017 | Lee | H04W 36/26 |
| 10,015,715 B2* | 7/2018 | Kim | H04W 68/005 |
| 10,070,272 B2* | 9/2018 | Malladi | H04W 4/06 |
| 10,111,202 B2* | 10/2018 | Kim | H04W 4/06 |
| 10,142,800 B2* | 11/2018 | Kim | H04W 76/40 |
| 10,149,118 B2* | 12/2018 | Lee | H04W 36/0061 |
| 10,194,356 B2* | 1/2019 | Kim | H04W 36/0061 |
| 10,231,174 B2* | 3/2019 | Byun | H04W 48/16 |
| 10,277,416 B2* | 4/2019 | Zhu | H04W 4/06 |
| 10,334,562 B2* | 6/2019 | Papasakellariou | H04W 72/005 |
| 10,375,757 B2* | 8/2019 | Kim | H04W 24/08 |
| 10,405,251 B2* | 9/2019 | Lee | H04W 36/06 |
| 10,462,839 B2* | 10/2019 | Jung | H04W 24/10 |
| 10,476,695 B2* | 11/2019 | Byun | H04W 76/00 |
| 10,524,169 B2* | 12/2019 | Kim | H04W 48/20 |
| 10,547,984 B2* | 1/2020 | Byun | H04W 76/00 |
| 10,681,501 B2* | 6/2020 | Byun | H04W 4/06 |
| 2005/0090278 A1* | 4/2005 | Jeong | H04W 36/0055 455/525 |
| 2006/0229075 A1 | 10/2006 | Kim et al. | |
| 2007/0054664 A1 | 3/2007 | Kim | |
| 2007/0060097 A1 | 3/2007 | Edge et al. | |
| 2007/0115935 A1 | 5/2007 | Qiu et al. | |
| 2007/0149166 A1 | 6/2007 | Turcotte et al. | |
| 2007/0254625 A1 | 11/2007 | Edge | |
| 2008/0009262 A1* | 1/2008 | Rudolf | H04W 76/50 455/404.1 |
| 2008/0171533 A1 | 7/2008 | Sharp et al. | |
| 2009/0176507 A1 | 7/2009 | Wu et al. | |
| 2009/0186594 A1* | 7/2009 | Kang | H04W 4/90 455/404.1 |
| 2009/0191841 A1 | 7/2009 | Edge et al. | |
| 2009/0280770 A1 | 11/2009 | Mahendran | |
| 2009/0296689 A1 | 12/2009 | Bakker et al. | |
| 2010/0067444 A1 | 3/2010 | Faccin et al. | |
| 2010/0118741 A1* | 5/2010 | Youn | H04W 72/1242 370/259 |
| 2011/0165856 A1 | 7/2011 | You et al. | |
| 2011/0194553 A1 | 8/2011 | Sahin et al. | |
| 2012/0015623 A1 | 1/2012 | Bakker et al. | |
| 2012/0028598 A1 | 2/2012 | Bakker et al. | |
| 2012/0028626 A1 | 2/2012 | Marocchi et al. | |
| 2012/0082091 A1 | 4/2012 | Siomina et al. | |
| 2013/0149986 A1 | 6/2013 | You | |
| 2013/0188607 A1 | 7/2013 | Mutikainen | |
| 2013/0195076 A1 | 8/2013 | Keller et al. | |
| 2013/0337766 A1 | 12/2013 | Bakker et al. | |
| 2014/0010179 A1 | 1/2014 | Lee | |
| 2014/0036755 A1* | 2/2014 | Lee | H04W 72/042 370/312 |
| 2014/0094122 A1 | 4/2014 | Etemad et al. | |
| 2014/0105095 A1* | 4/2014 | Lee | H04W 36/0007 370/312 |
| 2014/0133332 A1 | 5/2014 | Lee | |
| 2014/0141742 A1 | 5/2014 | Siow et al. | |
| 2014/0177811 A1 | 6/2014 | Malin | |
| 2014/0179260 A1 | 6/2014 | Malin | |
| 2014/0269482 A1 | 9/2014 | Pandey et al. | |
| 2014/0301248 A1 | 10/2014 | Lindholm et al. | |
| 2014/0370895 A1 | 12/2014 | Pandey et al. | |
| 2015/0016420 A1 | 1/2015 | Balabhadruni et al. | |
| 2015/0043398 A1 | 2/2015 | Fwu et al. | |
| 2015/0050941 A1 | 2/2015 | Sawada et al. | |
| 2015/0085791 A1 | 3/2015 | Baghel | |
| 2015/0092660 A1 | 4/2015 | Shperling et al. | |
| 2015/0181033 A1 | 6/2015 | Keller et al. | |
| 2015/0181610 A1* | 6/2015 | Lee | H04W 72/082 370/329 |
| 2015/0296351 A1 | 10/2015 | Tham et al. | |
| 2016/0073302 A1* | 3/2016 | Yang | H04W 36/0072 370/331 |
| 2016/0105880 A1* | 4/2016 | Bao | H04W 4/06 370/312 |
| 2016/0211980 A1* | 7/2016 | Zhu | H04W 72/005 |
| 2016/0212607 A1 | 7/2016 | Trichias et al. | |
| 2016/0249266 A1* | 8/2016 | Kim | H04W 36/0007 |
| 2016/0278042 A1* | 9/2016 | Kim | H04W 72/10 |
| 2016/0337817 A1* | 11/2016 | Malladi | H04W 4/06 |
| 2016/0381517 A1* | 12/2016 | Kim | H04W 76/40 370/331 |
| 2017/0310718 A1* | 10/2017 | Kim | H04W 48/12 |
| 2018/0077618 A1* | 3/2018 | Lee | H04W 40/22 |
| 2018/0077631 A1* | 3/2018 | Byun | H04W 36/0061 |
| 2018/0124574 A1* | 5/2018 | Byun | H04W 92/20 |
| 2018/0160274 A1* | 6/2018 | Byun | H04W 48/16 |
| 2018/0206289 A1* | 7/2018 | Kim | H04W 72/12 |
| 2018/0234809 A1* | 8/2018 | Byun | H04W 76/00 |
| 2018/0242206 A1* | 8/2018 | Kim | H04W 4/06 |
| 2018/0324559 A1* | 11/2018 | Byun | H04L 63/00 |
| 2018/0359104 A1* | 12/2018 | Byun | H04L 12/189 |
| 2019/0150077 A1* | 5/2019 | Byun | H04W 36/0061 455/434 |
| 2019/0230564 A1* | 7/2019 | Kim | H04W 4/06 |

FOREIGN PATENT DOCUMENTS

| | | |
|---|---|---|
| CN | 101189907 A | 5/2008 |
| CN | 101444118 A | 5/2009 |
| CN | 101489279 A | 7/2009 |
| CN | 101668273 A | 3/2010 |
| CN | 102497634 A | 6/2012 |
| CN | 103167456 A | 6/2013 |
| CN | 104160769 A | 11/2014 |
| CN | 105009621 A | 10/2015 |
| CN | 105075310 A | 11/2015 |
| EP | 2 852 215 A1 | 3/2015 |
| JP | 10-041875 A | 2/1998 |
| JP | 2013-175969 A | 9/2013 |
| KR | 10-2009-0023479 A | 3/2009 |
| KR | 10-2009-0079774 A | 7/2009 |
| KR | 10-2010-0053418 A | 5/2010 |
| WO | 2007/072462 A2 | 6/2007 |
| WO | 2008/133450 A1 | 11/2008 |
| WO | 2009/091191 A2 | 7/2009 |
| WO | 2009/137617 A1 | 11/2009 |
| WO | 2010/091573 A1 | 8/2010 |
| WO | 2013/051832 A2 | 4/2013 |
| WO | 2013/151484 A1 | 10/2013 |
| WO | 2014/081472 A1 | 5/2014 |
| WO | 2014/084848 A1 | 6/2014 |
| WO | 2014/204712 A1 | 12/2014 |
| WO | 2015/004142 A1 | 1/2015 |

(56) References Cited

FOREIGN PATENT DOCUMENTS

WO        2015/044367 A1    4/2015
WO        2015/160476 A1   10/2015

OTHER PUBLICATIONS

Chinese Office Action dated Jun. 3, 2020, issued in Chinese Application No. 201680067732.X.
European Notice of Allowance dated Jun. 15, 2020, issued in European Application No. 16866713.7-1212.

* cited by examiner

FIG. 20

| TIME \ DAY | MON | TUE | WED | THU | ... |
|---|---|---|---|---|---|
| 06:00 ~ 07:00 | DISCONNECTED | DISCONNECTED | CONNECTED | CONNECTED | ... |
| 07:00 ~ 08:00 | DISCONNECTED | DISCONNECTED | CONNECTED | CONNECTED | ... |
| 08:00 ~ 09:00 | CONNECTED | CONNECTED | CONNECTED | CONNECTED | ... |
| 09:00 ~ 10:00 | CONNECTED | CONNECTED | CONNECTED | CONNECTED | ... |
| ⋮ | ⋮ | ⋮ | ⋮ | ⋮ | ⋮ |
| 17:00 ~ 18:00 | CONNECTED | CONNECTED | DISCONNECTED | DISCONNECTED | ... |
| 18:00 ~ 19:00 | CONNECTED | CONNECTED | DISCONNECTED | DISCONNECTED | ... |
| 19:00 ~ 20:00 | DISCONNECTED | DISCONNECTED | DISCONNECTED | DISCONNECTED | ... |
| ⋮ | ⋮ | ⋮ | ⋮ | ⋮ | ⋮ |

METHOD AND DEVICE FOR SUPPORTING PUBLIC SAFETY NET ACCESS IN WIRELESS COMMUNICATION SYSTEM

TECHNICAL FIELD

The present invention relates to a wireless communication system and, more particularly, to a method and device for supporting a public safety network access.

BACKGROUND ART

Normally, a mobile communication system has been developed to provide a voice service while ensuring the user's activity. The mobile communication system, however, has expanded to a data service as well as a voice service and now is developed to provide a high-speed data service. Nevertheless, a lack of resources and a user's demand for a much higher speed service in the current mobile communication system requires a more advanced mobile communication system.

In order to meet such needs, standardization for LTE (Long Term Evolution) as one of the next generation mobile communication systems is progressing in 3GPP (Third Generation Partnership Project). LTE is a technology that implements high-speed packet-based communication with a transfer rate of up to 100 Mbps. For this, various schemes are discussed such as a scheme of reducing the number of nodes deployed on communication paths by simplifying the structure of a network, and a scheme of making wireless protocols approach a wireless channel as much as possible.

Meanwhile, in the data service unlike the voice service, allocable resources are determined depending on the amount of data to be transmitted and the channel status. Therefore, in a wireless communication system such as a mobile communication system, a scheduler performs management such as allocation of transmission resources in consideration of the amount of resources to be transmitted, the channel status, the amount of data, and the like. This is the same in LTE which is one of the next generation mobile communication systems, and the scheduler located in a base station manages and allocates wireless transmission resources.

Recently, LTE-advanced (LTE-A) for improving a transfer rate by combining various new technologies with the LTE communication system has been discussed in earnest. The discussion of the LTE-A system also includes the improvement of multimedia broadcast multicast service (MBMS). The MBMS is a broadcasting service provided through the LTE system.

On the other hand, in order to efficiently use a public safety network in the LTE communication system, it is necessary to distinguish a terminal (hereinafter referred to as a PS-LTE terminal) provided with a public safety service through the LTE communication system from a normal terminal. In order to efficiently use air interface resources, a certain service is provided to users in the form of MBMS. In particular, since an enhanced MBMS (eMBMS) service provides a service at a specific frequency, the PS-LTE terminal should be distinguished and moved to a specific frequency when several frequencies are supported.

DISCLOSURE OF INVENTION

Technical Problem

It is an object of the present invention to provide a method and device for supporting a public safety network access in a wireless communication system.

Solution to Problem

In order to solve the above problem, a method by a terminal for accessing a public safety network in a wireless communication system according to the present invention comprises transmitting a message including public safety network related information to a base station; determining whether a handover command is received from the base station in response to transmitting the message; and performing a handover, when the command is received, to a frequency band which supports a public safety network service.

In addition, a method by a base station for supporting a public safety network access of a terminal in a wireless communication system according to the present invention comprises receiving a message including public safety network related information from the terminal; determining, based on the message, whether a hand over the terminal to a frequency band which supports a public safety network service is needed; and if it is determined that the handover is needed, transmitting, to the terminal, a handover command to hand over the terminal to the frequency band which supports the public safety network service.

In addition, a terminal for accessing a public safety network in a wireless communication system according to the present invention comprises a transceiver configured to transmit and receive a signal to and from a base station; and a controller configured to control the transceiver to transmit a message including public safety network related information to the base station, to determine whether a handover command is received from the base station in response to transmitting the message, and to perform a handover, when the command is received, to a frequency band which supports a public safety network service.

In addition, a base station for supporting a public safety network access of a terminal in a wireless communication system according to the present invention comprises a transceiver configured to transmit and receive a signal to and from the terminal; and a controller configured to control the transceiver to receive a message including public safety network related information from the terminal, to determine, based on the message, whether a hand over the terminal to a frequency band which supports a public safety network service is needed, and if it is determined that the hand over is needed, to control the transceiver to transmit, to the terminal, a handover command to hand over the terminal to the frequency band which supports the public safety network service.

Advantageous Effects of Invention

According to the present invention, it is possible to recognize the access of a PS-LTE terminal through a distinction for the PS-LTE terminal and provide a PS-LTE service to the terminal. Also, it is possible to provide a differentiated function to the terminal through PS-LTE terminal information.

BRIEF DESCRIPTION OF DRAWINGS

FIG. 20 is a diagram illustrating an example for a terminal to collect PS-LTE related information according to the sixteenth embodiment of the present invention.

MODE FOR THE INVENTION

Figure 1:
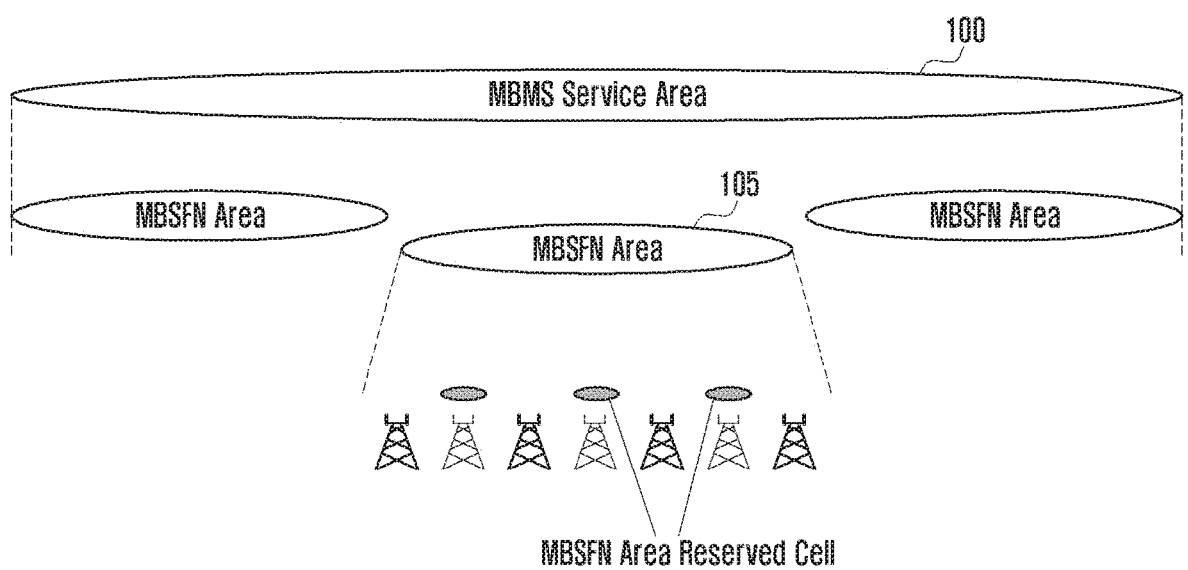
FIG. 1 is a diagram illustrating the concept of MBMS.

Hereinafter, embodiments of the present invention will be described with reference to the accompanying drawings.

In the following description of embodiments, descriptions of techniques that are well known in the art and not directly related to the present invention are omitted. This is to clearly convey the subject matter of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

A public safety network or public safety LTE (PS-LTE) described hereinafter may refer to a network that supports a push to talk (PTT) service based on enhanced MBMS (eMBMS) technology for large-capacity group communication. The public safety network or PS-LTE has a purpose of public safety or providing a communication service in disaster situations.

In a base station, the capability to provide the public safety network service may be determined depending on a release version of the base station.

Terminals may be classified into a terminal having the capability of receiving the PS-LTE service and a terminal failing to have such capability.

In addition, the public safety network service of the present invention may refer to a service provided through a public safety network based on eMBMS technology.

FIG. 1 is a diagram illustrating the concept of MBMS.

An MBMS service area 100 is a network area composed of a plurality of base stations capable of performing Multimedia Broadcast multicast service Single Frequency Network (MBSFN) transmission.

An MBSFN Area 105 (or broadcast area information, hereinafter used interchangeably) is a network area composed of several cells integrated for MBSFN transmission, and all cells in the MBSFN area are synchronized with respect to MBSFN transmission.

All cells except MBSFN area reserved cells 110 are used for MBSFN transmission. The MBSFN area reserved cell 110 is a cell that is not used for MBSFN transmission, but can be used for other purpose transmission. For radio resources allocated for MBSFN transmission limited transmission power may be allowed.

Figure 2:
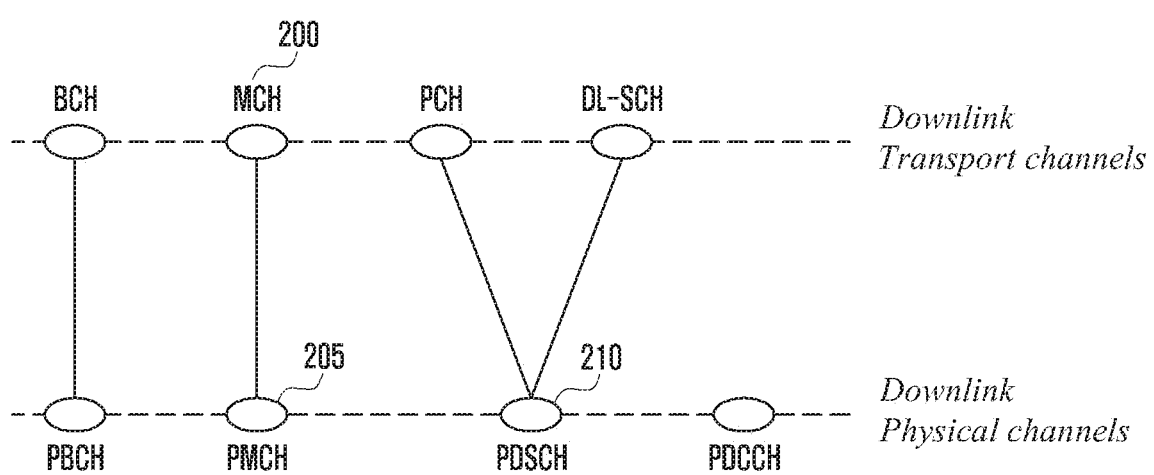
FIG. 2 is a diagram illustrating a downlink channel mapping relationship used for MBSFN transmission.

FIG. 2 is a diagram illustrating a downlink channel mapping relationship used for MBSFN transmission.

As shown in FIG. 2, an MCH 200 is used between the MAC layer and the physical layer, and the MCH is mapped to a PMCH 205 of the physical layer.

A unicast scheme of transmitting data only to a specific terminal generally uses a physical downlink shared channel (PDSCH) 210.

Figure 3:
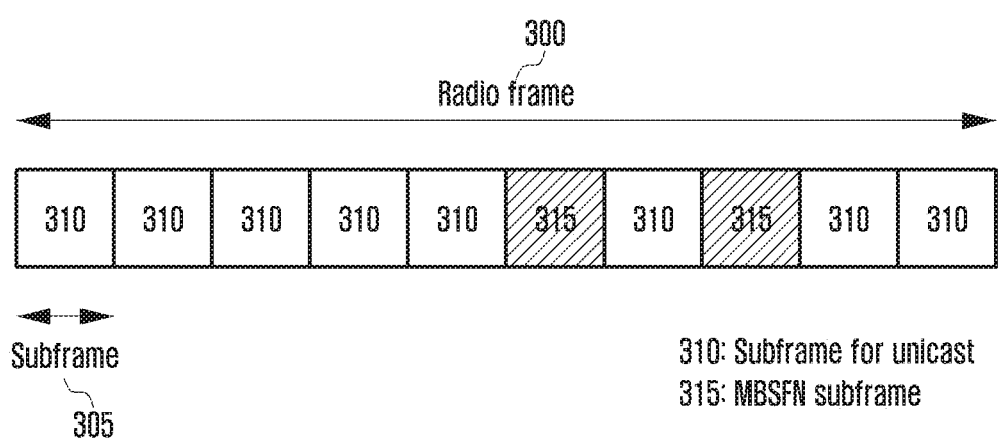
FIG. 3 is a diagram illustrating a structure of a downlink frame used in an LTE system.

FIG. 3 is a diagram illustrating a structure of a downlink frame used in an LTE system.

As shown in FIG. 3, a radio frame 300 is composed of ten subframes 305. Each subframe exists in the form of "a normal subframe 310" used for normal data transmission/reception or "an MBSFN subframe 315" used for broadcasts.

The normal subframe and the MBSFN subframe are different from each other in the number of orthogonal frequency division multiplexing (OFDM) symbols, the length of cyclic prefix, and the structure and number of cell-specific reference signals (CRSs).

Meanwhile, in Rel-8 and Rel-9 systems, the MBSFN subframe is used only for the purpose of transmitting broadcast or multicast data. However, as the system evolves, from LTE Rel-10, the MBSFN subframe can be used for the purpose of unicast as well as the purpose of broadcast or multicast.

In LTE, in order to efficiently use a physical downlink shared channel (PDSCH), respective terminals are classified according to transmission mode (TM) associated with a reference signal (RS) and a multi-antenna technology.

Currently, there are from TM1 to TM9 in LTE Rel-10. Each terminal has one TM for PDSCH transmission. TM8 has been newly defined in Rel-9, and TM9 has been newly defined in Rel-10.

In particular, TM9 supports a single user multi-input multi-output (SU-MIMO) having up to eight ranks. TM9 supports transmission of multiple layers and enables transmission of up to eight layers by using Rel-10 demodulation reference signal (DMRS) during demodulation. Also, in case of the Rel-10 DMRS, a precoded DMRS is transmitted, but there is no need to notify a corresponding precoder index to a receiver.

Additionally, in order to support TM9, a downlink control information (DCI) format 2C has been newly defined in Rel-10. By the way, terminals prior to Rel-10 do not attempt decoding in the MBSFN subframe. Therefore, enabling all terminals to attempt decoding in the MBSFN subframe causes a demand for upgrading the terminal of the previous release.

Among the above-mentioned TMs, TM9 is a transmission mode that maximizes transmission efficiency by using multiple antennas. In the present invention, a base station configures TM9 to a terminal that needs to increase data throughput by receiving unicast data even in the MBSFN subframe, and allows only the TM9-configured terminal to receive unicast data in the MBSFN subframe.

Meanwhile, for transmission/reception of unicast data, the LTE system informs, on the PDCCH, where data transmission/reception actually occurs, and actual data is transmitted on the PDSCH. Before receiving the actual data, a terminal should determine whether there is resource allocation information allocated to the terminal in the PDCCH.

On the other hand, in case of the MBSFN, resource allocation information is acquired through a somewhat more complicated process.

First, through system information block 13 (SIB13) which is broadcast information, a base station informs a terminal about a transmission position of a multicast control channel (MCCH) per MBSFN area provided by a cell. The MCCH includes resource allocation information for the MBSFN, and the terminal can know a transmission position of the MBSFN subframe by decoding the MCCH.

As described above, the reason that the MBMS provides the resource allocation information in a manner different from a typical unicast manner is that the MBMS should be able to be provided to a terminal which is in an idle mode. Therefore, the transmission position of the MCCH which is a control channel is informed via the broadcast information SIB13. The overall process of receiving an MBMS service will be described with reference to FIG. 4.

Figure 4:
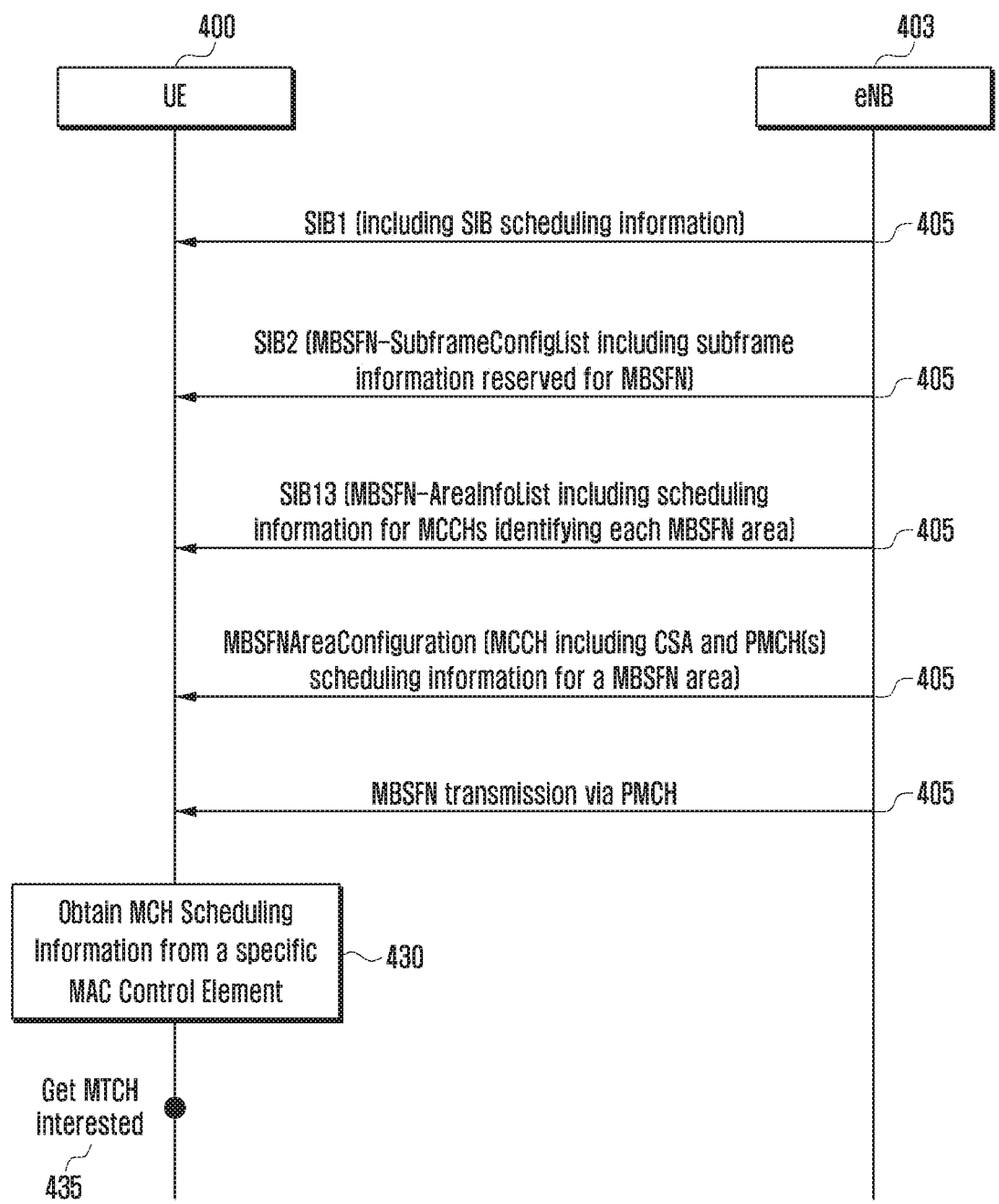
FIG. 4 is a flow diagram illustrating a process for MBSFN reception of a terminal.

FIG. 4 is a flow diagram illustrating a process for MBSFN reception of a terminal.

At step 405, a terminal (UE) 400 receives SIB1 from a base station (eNB) 403. The SIB1 includes scheduling information for other SIBs. Therefore, in order to receive other SIBs, the SIB1 should be received in advance.

At step 410, the UE 400 receives SIB2 from the eNB 403. An MBSFN subframe configuration list (MBSFN-SubframeConfigList IE) of the SIB2 indicates subframes that can be used for the purpose of MBSFN transmission.

The MBSFN-SubframeConfigList IE includes an MBSFN-SubframeConfig IE that indicates which subframe of a radio frame can become an MBSFN subframe. Table 1 below shows the MBSFN-SubframeConfig IE.

TABLE 1

```
MBSFN-SubframeConfig information element
-- ASN1START
MBSFN-SubframeConfig ::=           SEQUENCE {
    radioframeAllocationPeriod      ENUMERATED {n1, n2,
n4, n8, n16, n32},
    radioframeAllocationOffset      INTEGER (0..7),
    subframeAllocation              CHOICE {
        oneFrame                        BIT
STRING (SIZE(6)),
        fourFrames                      BIT
STRING (SIZE(24))
    }
}
-- ASN1STOP
```

Here, a radio frame allocation period (radioFrameAllocationPeriod) and a radio frame allocation offset (radioFrameAllocationOffset) are used to indicate a radio frame having the MBSFN subframe, and a radio frame satisfying the following equation has the MBSFN subframe: "SFN mod radioFrameAllocationPeriod=radioFrameAllocationOffset"

SFN denotes a system frame number and indicates a radio frame number. The SFN has a range from 0 to 1023 and is repeated.

A subframe allocation indicates which subframe is the MBSFN subframe in the radio frame indicated by the above equation.

The subframe allocation may be indicate in one radio frame unit or four radio frames unit. When the one radio frame unit is used, the subframe allocation is indicated in oneFrame IE. The MBSFN subframe may exist in the 1st, 2nd, 3rd, 6th, 7th, and 8th subframes among a total of 10 subframes in one radio frame. Therefore, using 6 bits, the oneFrame IE indicates the MBSFN subframe among the above-listed subframes.

When the four radio frames unit is used, the subframe allocation is indicated in fourFrames IE. A total of 24 bits is used to cover four radio frames, and indicate the MBSFN subframe among the above-listed subframes for each radio frame. Therefore, using the MBSFN-SubframeConfigList IE, the UE can exactly know a subframe that can be the MBSFN subframe.

If the UE 400 desires MBSFN reception, the UE 400 receives SIB13 from the eNB 405 at step 415. An MBSFN area information list (MBSFN-AreaInfoList IE) of the SIB13 includes location information on MCCH per MBSFN area provided by the cell. Using this information, the UE receives the MCCH at step 420.

Table 2 below shows the MBSFN-AreaInfoList IE.

There is an MCCH corresponding to each MBSFN area, and the MBDFN-AreaInfoList IE includes MCCH scheduling information of all MBSFN areas. The MBSFN-AreaInfo IE contains MCCH scheduling and other information. An mbsfn-AreaId is an MBSFN area ID. A non-MB SFNregionLength indicates the number of symbols corresponding to a non-MBSFN region among symbols in the MBFSN subframe. Such symbols are located at a front part of the subframe. A notificationIndicator is used to indicate a PDCCH bit for informing the UE about a change of MCCH information. An mcch-Config IE contains MCCH scheduling information. An mcch-RepetitionPeriod and an mcch-Offset are used to indicate the location of a frame containing the MCCH. An mcch-ModificationPeriod is a transmission period of the MCCH, and an sf-AllocInfo indicates the location of a subframe containing the MCCH in the frame including the MCCH. A signalingMCS indicates a modulation and coding scheme (MCS) applied to (P)MCH and the subframe indicated by the sf-AllocInfo.

TABLE 2

```
MBSFN-AreaInfoList information element
-- ASN1START
MBSFN-AreaInfoList-r9 ::=          SEQUENCE
(SIZE(1..maxMBSFN-Area)) OF MBSFN-AreaInfo-r9
    MBSFN-AreaInfo-r9 ::=              SEQUENCE {
        mbsfn-AreaId-r9                    INTEGER
(0..255),
        non-MBSFNregionLength              ENUMERATED
{s1, s2},
        notificationIndicator-r9           INTEGER (0..7),
        mcch-Config-r9                     SEQUENCE
{
        mcch-RepetitionPeriod-r9           ENUMERATED
{rf32, rf64, rf128, rf256},
        mcch-Offset-r9
INTEGER (0..10),
        mcch-ModificationPeriod-r9         ENUMERATED
{rf512, rf1024},
        sf-AllocInfo-r9                    BIT
STRING (SIZE(6)),
        signallingMCS-r9
    ENUMERATED {n2, n7, n13, n19}
    },
    ...
}
```

An MBSFNAreaConfiguration IE of the MCCH indicates the location of a resource used for MBSFN transmission. Using this information, the UE receives the MBSFN subframe at step 425. A commonSF-Alloc denotes a subframe allocated to the MBSFN area. A commonSF-AllocPeriod is a period in which subframes indicated by the commonSF-Alloc are repeated.

A pmch-InfoList IE includes all the PMCH configuration information of one MBSFN area.

TABLE 3

```
MBSFNAreaConfiguration message
-- ASN1START
MBSFNAreaConfiguration-r9 ::=      SEQUENCE {
    commonSF-Alloc-r9
CommonSF-AllocPatternList-r9,
    commonSF-AllocPeriod-r9            ENUMERATED {
rf4, rf8, rf16, rf32, rf64, rf128, rf256},
    pmch-InfoList-r9                   PMCH-InfoList-r9,
    nonCriticalExtension
MBSFNAreaConfiguration-v930-IEs    OPTIONAL
```

TABLE 3-continued

```
}
    MBSFNAreaConfiguration-v930-IEs ::= SEQUENCE {
        lateNonCriticalExtension         OCTET STRING
                        OPTIONAL, -- Need OP
        nonCriticalExtension            SEQUENCE { }
                        OPTIONAL --Need OP
    }
CommonSF-AllocPatternList-r9 ::= SEQUENCE        (SIZE
(1..maxMBSFN-Allocations)) OF MBSFN-SubframeConfig
    -- ASN1STOP
```

At step 430, the UE acquires an MBSFN subframe location for transmission of a desired MTCH from the MCH scheduling information MAC CE which is one of the MAC control elements (CEs) of the received MAC PDU. Using the MCH scheduling information, the UE decodes the desired MTCH at step 435.

Meanwhile, a conventional PS-LTE terminal is not distinguished from a normal terminal and receives the same service. That is, conventionally, it is not possible to distinguish the PS-LTE terminal and the normal terminal.

Therefore, although the PS-LTE terminal should shift to a specific frequency in order to receive the e-MBMS service for PS-LTE, there is no access method differentiated from that of the normal terminal because of no separate message for a PS-LTE service request or a distinction for the PS-LTE terminal.

Accordingly, there is a problem that it is not possible to shift the PS-LTE terminal to a specific frequency band that supports the PS-LTE service.

In the following embodiment of the present invention, a solution for solving the above problem is provided.

At the outset, in the first embodiment of the present invention, a scheme that the PS-LTE terminal allows the base station to recognize that the terminal supports the PS-LTE service will be described.

In the second embodiment of the present invention, a scheme that the PS-LTE terminal that is receiving, like the normal terminal, a service from the base station via an arbitrary frequency receives a PS-LTE service when a specific condition is satisfied will be described.

In the third embodiment of the present invention, a scheme that the base station broadcasts information on a frequency for providing a PS-LTE service will be described.

Hereinafter, the first embodiment in which the PS-LTE terminal allows the base station to recognize that the terminal supports the PS-LTE service will be described.

According to the first embodiment, the PS-LTE terminal may add, to a terminal capability message, information related to a public safety network, for example, information indicating that the terminal can receive a PS-LTE service. When a terminal having the above information accesses a base station, the base station hands over the PS-LTE terminal to a frequency band for the PS-LTE service.

A detailed operation process of the first embodiment will be described with reference to FIG. 5.

Figure 5:
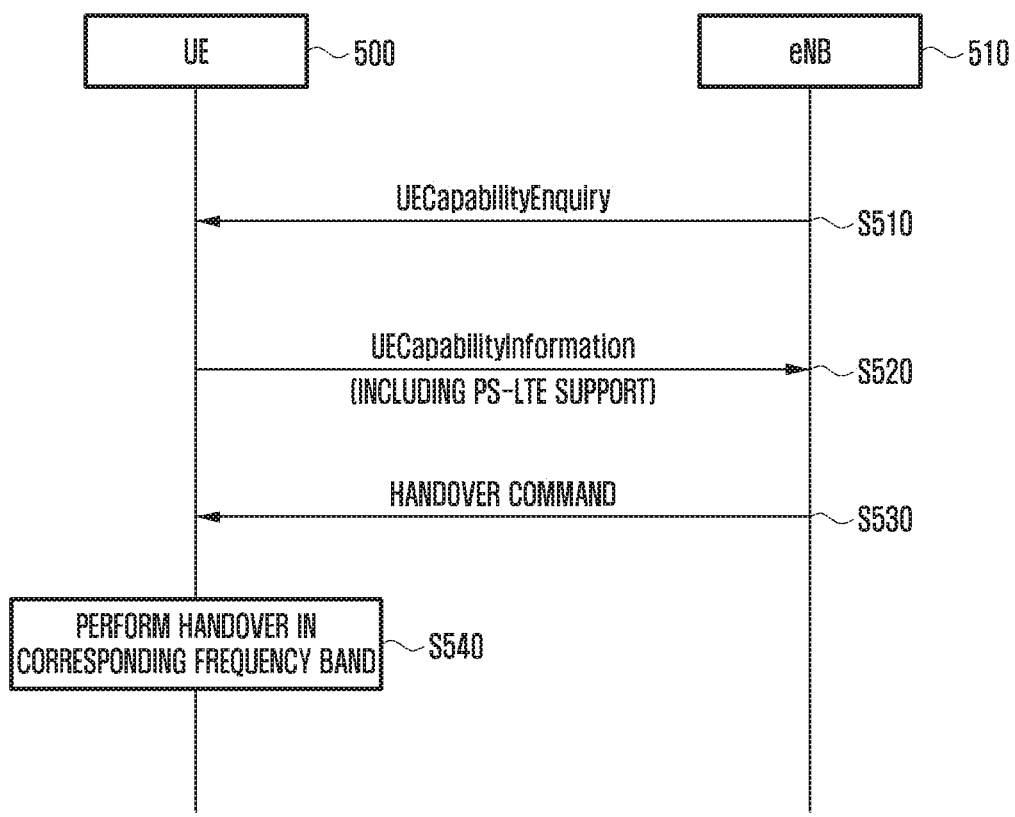
FIG. 5 is a flow diagram illustrating a process for a terminal to notify a base station that the terminal is a terminal supporting a PS-LTE service, according to the first embodiment of the present invention.

FIG. 5 is a flow diagram illustrating a process for a terminal to notify a base station that the terminal is a terminal supporting a PS-LTE service, according to the first embodiment of the present invention.

At step S510, the base station (eNB) 510 transmits a UE capability enquiry message (UECapabilityEnquiry) to the terminal (UE) 500.

Then, the UE 500 may check whether it supports the PS-LTE. If it is determined that the UE 500 supports the PS-LTE, the UE 500 transmits at step S520 a UE capability information message (UECapabilityInformation) including the public safety network related information, for example, an indication of supporting the PS-LTE to the eNB 510. This indication indicating that the PS-LTE is supported may be, for example, a PS-LTE support.

When receiving the UECapabilityInformation from the UE 500, the eNB 510 determines whether it is necessary to hand over the UE to a specific frequency band in order to provide a PS-LTE service. This specific frequency band that provides the PS-LTE service may be a frequency band that provides eMBMS.

For example, if the UE 500 has already accessed the eNB 510 through a frequency band for providing the eMBMS, the eNB 510 may not transmit a separate handover command to the UE 500.

On the other hand, if it is determined to have to perform a handover to a frequency band for providing the eMBMS in order to provide the PS-LTE service to the UE 500, the eNB 500 may transmit a handover command message to the UE 500 at step S530.

Then, at step S540, the UE 500 may perform a handover to a frequency band according to the handover command for the UE 500. In this case, the handover may be an inter-frequency handover.

The UE 500 that performs the handover to a frequency band that provides the eMBMS service may receive the PS-LTE service in that frequency band.

Now, the second embodiment in which the PS-LTE terminal that is receiving, like the normal terminal, a service from the base station via a certain frequency receives a PS-LTE service when a specific condition is satisfied will be described.

After the RRC connection setup, the PS-LTE terminal according to the second embodiment may further perform an operation of transmitting the public safety network related information, e.g., a PSInterestIndication message to the base station. This may be included, for example, in a basic call setup process. Then, the base station may trigger an operation of handing over the terminal to a frequency band of the PS-LTE service.

When the PSInterestIndication message is received from the terminal, the base station may not take separate measures if the terminal is camping on the frequency band for the PS-LTE service. On the other hand, if the terminal is not camping on the frequency band for the PS-LTE service, the base station may hand over the terminal to the frequency band for the PS-LTE service. This handover may be an inter-frequency handover.

The second embodiment of the present invention will be described with reference to FIG. 6.

Figure 6:
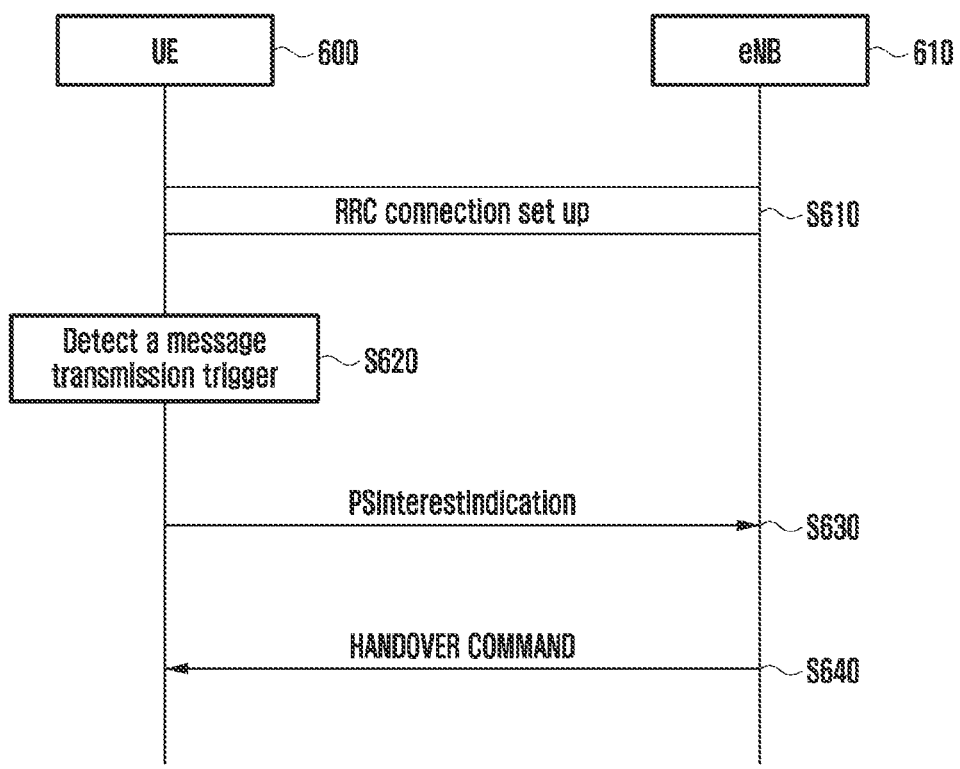
FIG. 6 is a flow diagram illustrating a process for a terminal to notify a PS-LTE support to a base station, according to the second embodiment of the present invention.

FIG. 6 is a flow diagram illustrating a process for a terminal to notify a PS-LTE support to a base station, according to the second embodiment of the present invention.

At step S610, the terminal (UE) 600 and the base station (eNB) 610 may perform an RRC connection setup procedure. For this, although not shown, the UE 600 may transmit an RRC connection request message to the eNB 610, and in response to this, the eNB 610 may transmit an RRC connection setup message to the UE 600. Then, the UE 600 may transmit an RRC connection setup complete message to the eNB 610.

Thereafter, the UE 600 may determine at step S620 whether a message transmission trigger event for the eNB 610 occurs. For example, the UE 600 may determine whether an application for starting the PS-LTE service is executed in the UE 600.

If it is detected that the message transmission trigger event occurs, the UE 600 may transmit a message including the public safety network related information, for example, the PS-LTE interest indication to the eNB 610 at step S630.

In this case, the eNB 610 may not take additional measures if the UE 600 is camping on the frequency band for the PS-LTE service. On the other hand, if the UE 600 is not camping on the frequency band for the PS-LTE service, the eNB 610 may transmit a handover command message to the UE 600 at step S640. Then, the UE 600 performs a handover to the frequency band for the PS-LTE service.

Now, the third embodiment in which the base station broadcasts information on the frequency for providing the PS-LTE service will be described.

According to the third embodiment of the present invention, the base station can broadcast information on a specific frequency supporting the PS-LTE service to the terminal through a system information block (SIB) 15. The information on the specific frequency supporting the PS-LTE service may be information on the specific frequency itself or may be an indication indicating that the base station supports the PS-LTE service.

For the above, in the third embodiment of the present invention, PS-LTE support frequency information (ps-lte-support) may be added to the SIB15 message as shown in Table 4 below.

TABLE 4

| MBMS-SAI-InterFreq-r11 ::= | SEQUENCE { |
|---|---|
| d1-CarrierFreq-r11 | |
| ARFCN-ValueEUTRA-r9, | |
| mbms-SAI-List-r11 | MBMS-SAI-List-r11 |
| ps-lte-support | ENUMERATED |
| {true}} | |

The above contents will be described with reference to FIG. 7.

Figure 7:
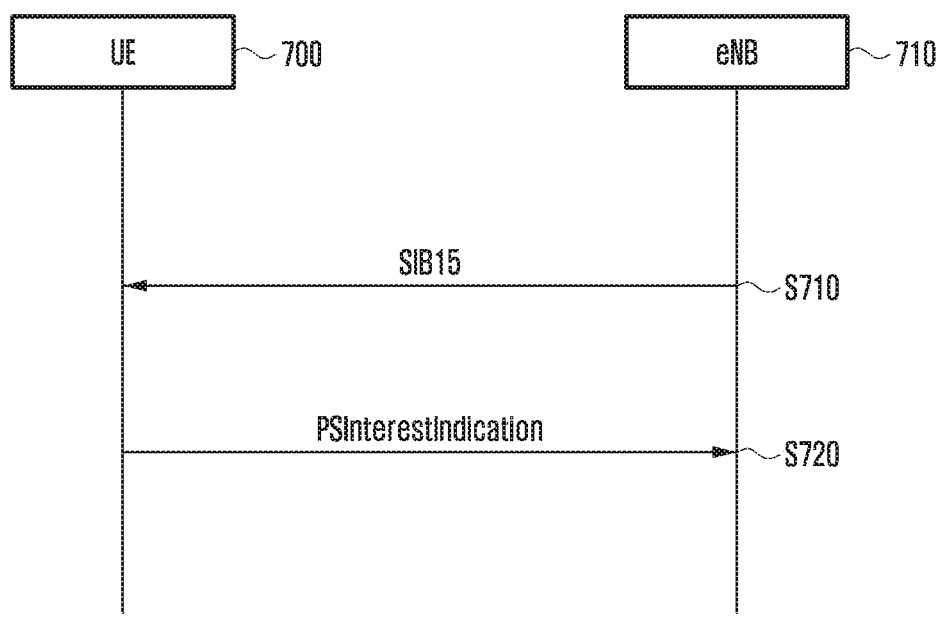
FIG. 7 is a flow diagram illustrating a process for a base station to broadcast information on a specific frequency supporting a PS-LTE service to a terminal, according to the third embodiment of the present invention.

FIG. 7 is a flow diagram illustrating a process for a base station to broadcast information on a specific frequency supporting a PS-LTE service to a terminal, according to the third embodiment of the present invention.

At the outset, the base station (eNB) 710 may determine whether it supports the PS-LTE service. If the PS-LTE service is supported, the eNB may check information on the frequency band that supports the PS-LTE service.

Then, the eNB 710 may generate an SIB message including information on the frequency band supporting the PS-LTE service. This SIB message may be SIB15, for example.

Then, at step S710, the eNB 710 broadcasts the generated SIB15 message.

Then, the UE 700 may receive the SIB15 message broadcasted by the eNB 710. Therefore, the UE 700 may know that the eNB 710 accessed by the UE 700 provides the PS-LTE service.

Also, the UE 700 determines whether it is necessary to transmit a message including the PS interest indication to the eNB 710. For example, the UE 700 may determine whether an application for starting the PS-LTE service is executed in the UE 700.

If it is detected that the message transmission trigger event occurs, the UE 700 may transmit a message including the PS-LTE interest indication to the eNB 710 at step S720.

Although the subsequent process is not shown, the eNB 710 may not take additional measures if the UE 700 is camping on the frequency band for the PS-LTE service. On the other hand, if the UE 700 is not camping on the frequency band for the PS-LTE service, the eNB 710 may transmit a handover command message to the UE 700. Then, the UE 700 may perform a handover to the frequency band for the PS-LTE service.

Hereinafter, the fourth embodiment in which the base station informs the terminal about providing the PS-LTE service will be described.

According to the fourth embodiment of the present invention, in a random access procedure, the base station may inform the terminal that the base station supports the PS-LTE service. This informing may be notifying the specific frequency itself supporting the PS-LTE service or may be sending an indication that the base station supports the PS-LTE service.

A detailed description will be made with reference to FIG. 8.

Figure 8:
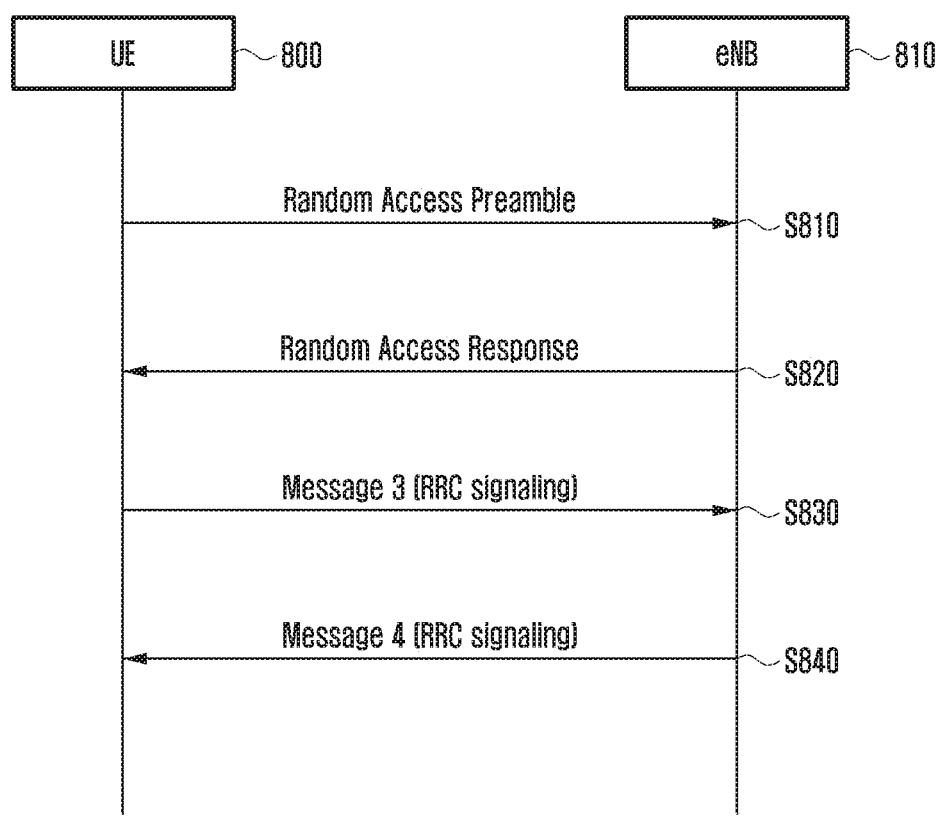
FIG. 8 is a diagram illustrating a random access procedure according to the fourth embodiment of the present invention.

FIG. 8 is a diagram illustrating a random access procedure according to the fourth embodiment of the present invention.

Referring to FIG. 8, at step S810 as the first step of the random access procedure, the terminal (UE) 800 transmits a random access preamble to the base station (eNB) 810.

Then, the eNB 810 measures a transmission delay value between the UE 800 and the eNB 810, and also adjusts uplink synchronization. At this time, the UE 800 arbitrarily selects a random access preamble to be used from a given set of random access preambles. In addition, the initial transmission power of the random access preamble is determined by a path loss, measured by the UE 800, between the eNB and the UE.

At step S820 as the second step, the eNB 810 transmits a random access response message to the UE 800. At this time, the eNB 810 transmits a timing adjustment command to the UE through the random access response message, based on the transmission delay value measured at the first step.

Also, the eNB 810 transmits, as scheduling information, uplink resource and power control commands to be used by the UE.

In addition, according to an embodiment of the present invention, the eNB 810 may inform, through the random access response message, the UE 800 that the eNB 810 supports the PS-LTE service. Information indicating that the eNB 810 supports the PS-LTE service may be an indication for indicating support or not, or may include information on a frequency that supports the PS-LTE service.

If the UE 800 fails to receive the scheduling information (i.e., the random access response) from the eNB 810 at the second step S820, the UE 800 performs the second step 820 again.

At step S830 as the third step, the UE 800 transmits uplink data (message 3) including its own UE ID to the eNB 810 through the uplink resources allocated at the second step S820. At this time, the transmission timing and transmission power of the UE 800 complies with commands received from the eNB 810 at the second step S820.

Finally, at step S840 as the fourth step, the eNB 810 transmits data (message 4) including the ID of the UE that transmits the uplink data at the third step S830 to the corresponding UE when it is determined that the UE 800 performs a random access without conflict with any other terminal. When a signal is received from the eNB 810 at the fourth step S840, the UE 800 determines that the random access is successful.

If the eNB 810 fails to receive a data signal from the UE 800 because the data transmitted by the UE 800 at the third step S830 conflicts with data from other terminal, the eNB 810 does not any more transmit data to the UE 800.

Therefore, when the UE 800 fails to receive data transmitted at the fourth step S840 from the eNB 810 for a predetermined time, the UE 800 determines that the random access procedure fails, and starts again from the first step S810. If the random access is successful, the UE 800 sets the initial transmission power of an uplink data channel or control channel for transmission to the eNB 810, based on a transmission power value of the UE power-controlled by the random access.

Figure 9:
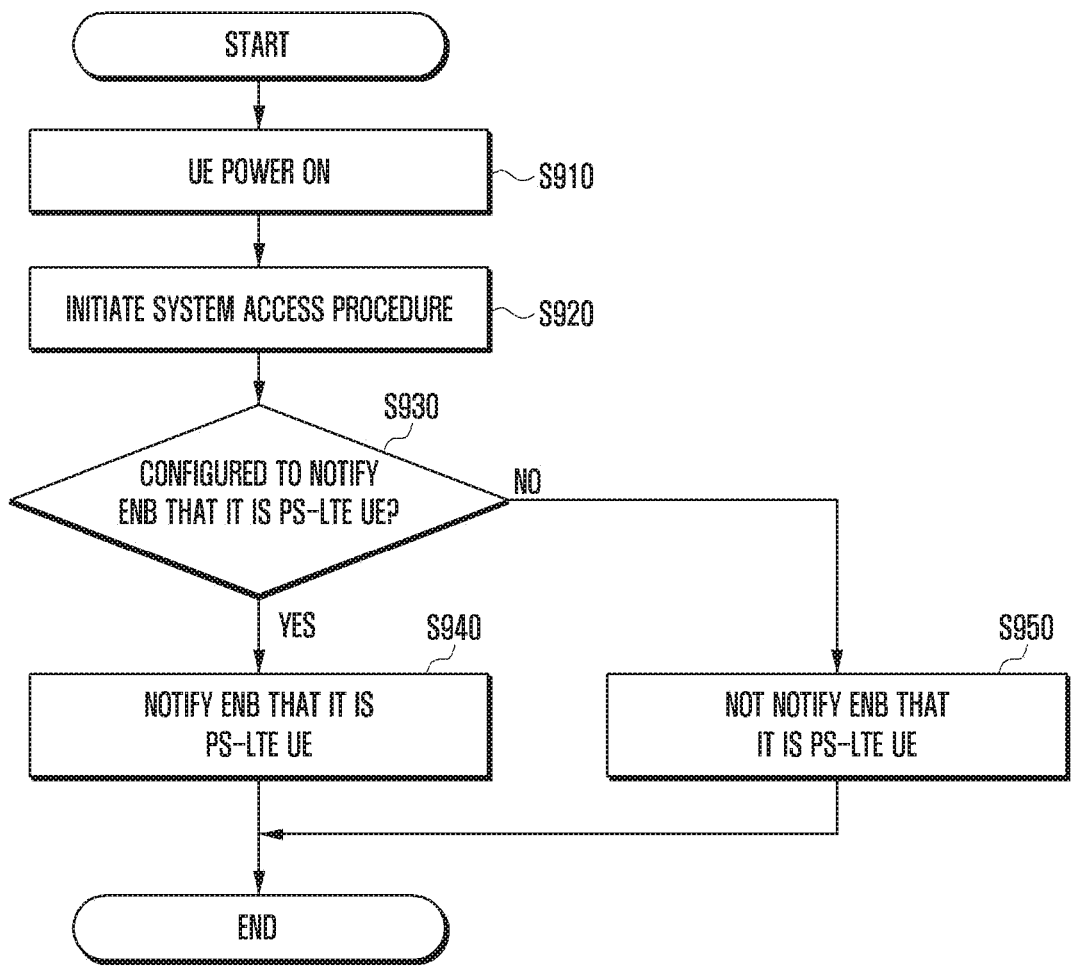
FIG. 9 is a flow diagram illustrating an operation procedure of a terminal according to the fifth embodiment of the present invention.

FIG. 9 is a flow diagram illustrating an operation procedure of a terminal according to the fifth embodiment of the present invention.

The fifth embodiment of the present invention relates to an embodiment in which, when initially accessing the system, a PS-LTE terminal (PS-LTE UE) informs a base station (eNB) that it is the PS-LTE UE or UE that supports the PS-LTE service.

At the outset, at step S910, the UE detects that the power is turned on. Then, the UE initiates a system access procedure at step S920. For example, the UE may search for a cell and thereby perform the access procedure for a cell from which the strongest signal is received.

At step S930, the UE may determine whether it is configured to notify the eNB that the UE is the PS-LTE UE. For this, the UE may check a user setting state such as environment settings. Alternatively, the UE may check a default state configured at the manufacture.

If it is determined that the UE is configured to notify the eNB that it is the PS-LTE UE, the UE may notify at step S940 the eNB that it is the PS-LTE UE. This notification method may not be limited to a specific one. For example, a radio resource control (RRC) message may be used for this notification. Alternatively, a UE capability message may be used for this notification. Alternatively, for this notification, the UE and the eNB may define a new message.

If it is determined that the UE is configured not to notify the eNB that it is the PS-LTE UE, the UE may not notify at step S950 the eNB that it is the PS-LTE UE.

Figure 10:
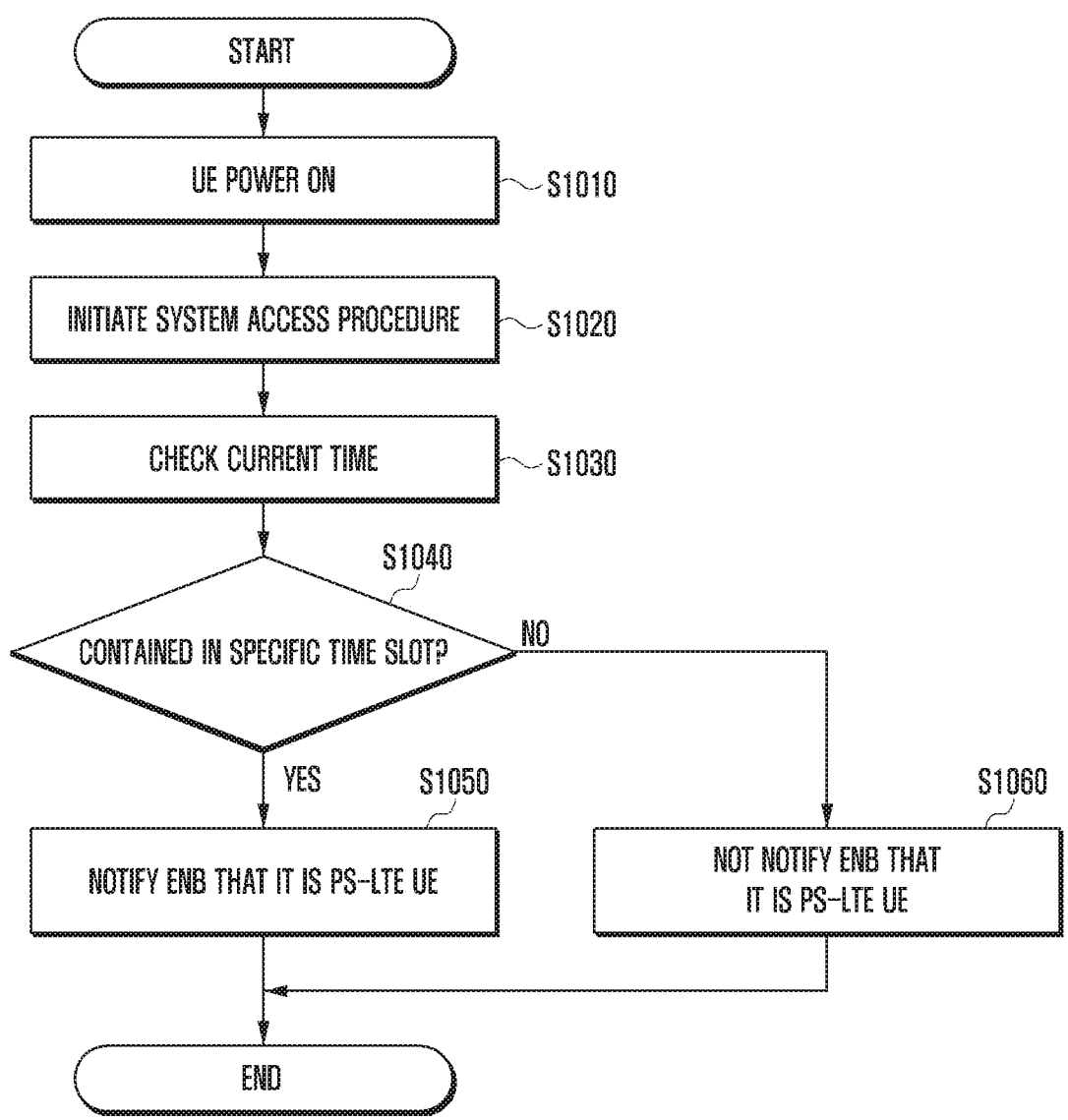
FIG. 10 is a flow diagram illustrating an operation procedure of a terminal according to the sixth embodiment of the present invention.

FIG. 10 is a flow diagram illustrating an operation procedure of a terminal according to the sixth embodiment of the present invention.

The sixth embodiment of the present invention relates to another embodiment in which, when initially accessing the system, a PS-LTE terminal (PS-LTE UE) informs a base station (eNB) that it is the PS-LTE UE or UE that supports the PS-LTE service.

At the outset, at step S1010, the UE detects that the power is turned on. Then, the UE initiates a system access procedure at step S1020. For example, the UE may search for a cell and thereby perform the access procedure for a cell from which the strongest signal is received.

At step 1030, the UE may check a current time. Then, at step S1040, the UE may determine whether the current time is contained in a specific time slot.

PS-LTE is a public safety network related service, for example, emergency rescue, radio communication in case of disaster, or the like. A user who uses the PS-LTE UE may be, for example, a firefighter, a police officer, a doctor, a nurse, or the like. While they are likely to use their own terminals for public safety network related services during working hours, they are likely to use their own terminals for their private lives during off hours.

Thus, in one embodiment of the present invention, the UE may determine whether the current time corresponds to a specific time, for example, a user's working time. A detailed method for statistically determining whether the current time corresponds to a user's working time will be described later.

If the current time is contained in the specific time slot, the UE may notify at step S1050 the eNB that it is the PS-LTE UE. This notification method may not be limited to a specific one. For example, a radio resource control (RRC) message may be used for this notification. Alternatively, a UE capability message may be used for this notification. Alternatively, for this notification, the UE and the eNB may define a new message.

If the current time is not contained in the specific time slot, the UE may not notify at step S1060 the eNB that it is the PS-LTE UE.

Figure 11:
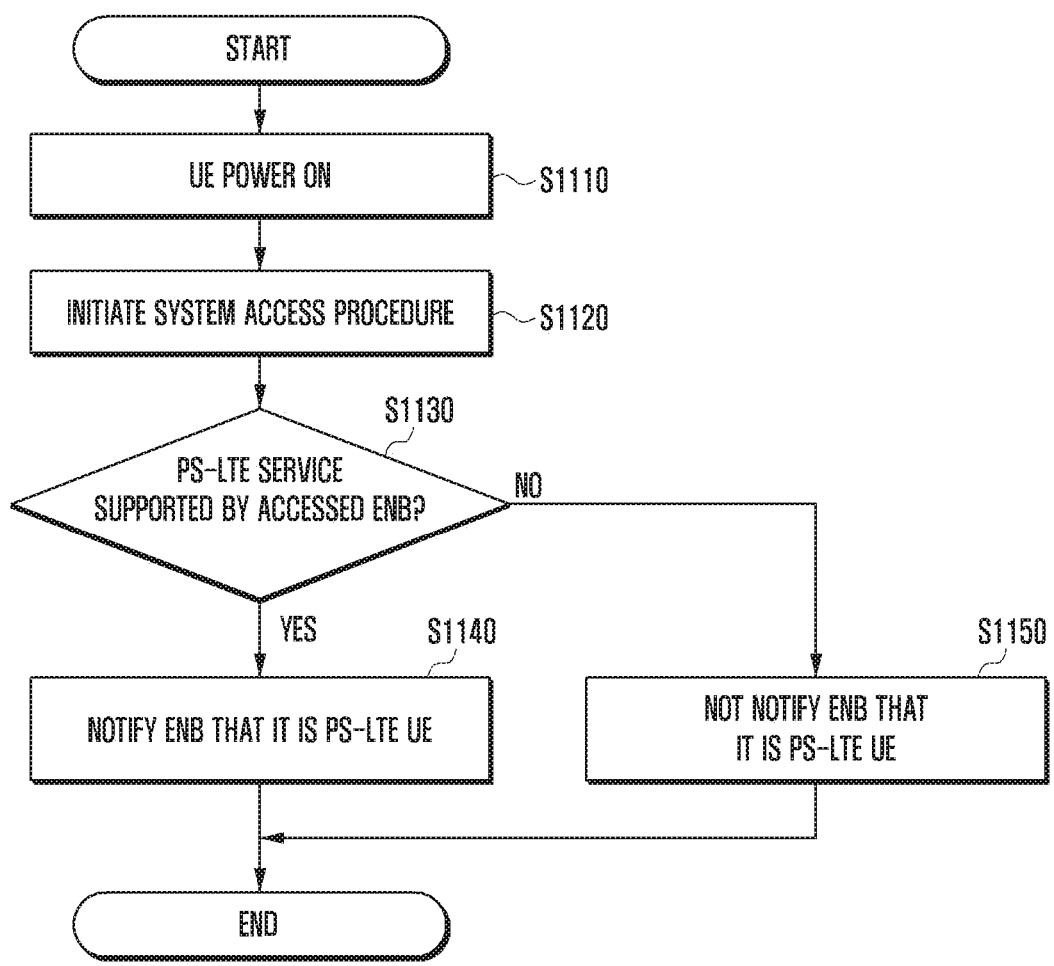
FIG. 11 is a flow diagram illustrating an operation procedure of a terminal according to the seventh embodiment of the present invention.

FIG. 11 is a flow diagram illustrating an operation procedure of a terminal according to the seventh embodiment of the present invention.

The seventh embodiment of the present invention relates to still another embodiment in which, when initially accessing the system, a PS-LTE terminal (PS-LTE UE) informs a base station (eNB) that it is the PS-LTE UE or UE that supports the PS-LTE service.

At the outset, at step S1110, the UE detects that the power is turned on. Then, the UE initiates a system access procedure at step S1120. For example, the UE may search for a cell and thereby perform the access procedure for a cell from which the strongest signal is received.

At step 1130, the UE may determine whether the accessed eNB supports the PS-LTE service. For this, the UE may check, for example, system information received from the eNB. Alternatively, as will be described later, the UE may check through a short message service (SMS) message of open mobile alliance (OMA) protocol whether the accessed eNB supports the PS-LTE service.

If the currently accessed eNB supports the PS-LTE service, the UE may notify at step S1140 the eNB that it is the PS-LTE UE. This notification method may not be limited to a specific one. For example, a radio resource control (RRC) message may be used for this notification. Alternatively, a UE capability message may be used for this notification. Alternatively, for this notification, the UE and the eNB may define a new message.

If the currently accessed eNB does not support the PS-LTE service, the UE may not notify at step S1150 the eNB that it is the PS-LTE UE.

Figure 12:
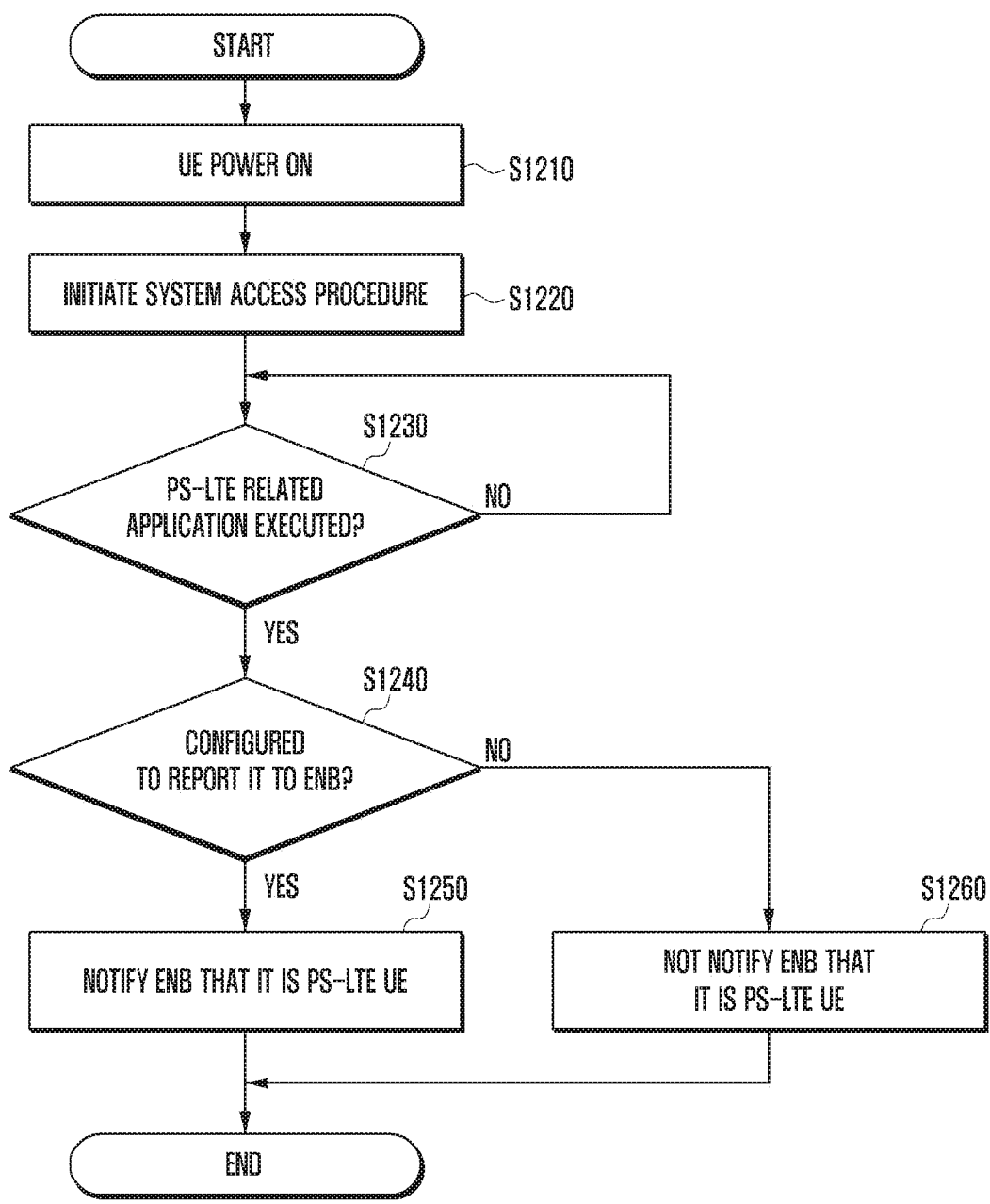
FIG. 12 is a flow diagram illustrating an operation procedure of a terminal according to the eighth embodiment of the present invention.

FIG. 12 is a flow diagram illustrating an operation procedure of a terminal according to the eighth embodiment of the present invention.

The eighth embodiment of the present invention relates to an operation of notifying a base station (eNB) that a PS-LTE related application is executed, when a terminal (UE) detects this execution.

At the outset, at step S1210, the UE detects that the power is turned on. Then, the UE initiates a system access procedure at step S1220. For example, the UE may search for a cell and thereby perform the access procedure for a cell from which the strongest signal is received.

At step 1230, the UE may determine whether the execution of the PS-LTE related application is detected. The PS-LTE related application may include, for example, a voice packet transmission/reception application, a video packet transmission/reception application, a high definition (HD) video call application, a walkie-talkie related application, and the like.

Using category information (classification of finance, movie, music, PS-LTE, etc.), an application identifier (ID), or the like included in a package header of the application, the UE may detect the type of the executed application.

If the execution of the PS-LTE related application is detected, the UE may determine at step S1240 whether it is configured to notify the eNB that the UE is the PS-LTE UE. For this, the UE may check a user setting state such as environment settings. Alternatively, the UE may check a default state configured at the manufacture.

If configured to report to the eNB, the UE may notify at step S1250 the eNB that it is the PS-LTE UE. This notification method may not be limited to a specific one. For example, a radio resource control (RRC) message may be used for this notification. Alternatively, a UE capability message may be used for this notification. Alternatively, for this notification, the UE and the eNB may define a new message.

If not configured to report to the eNB, the UE may not notify at step S1260 the eNB that it is the PS-LTE UE.

Figure 13:
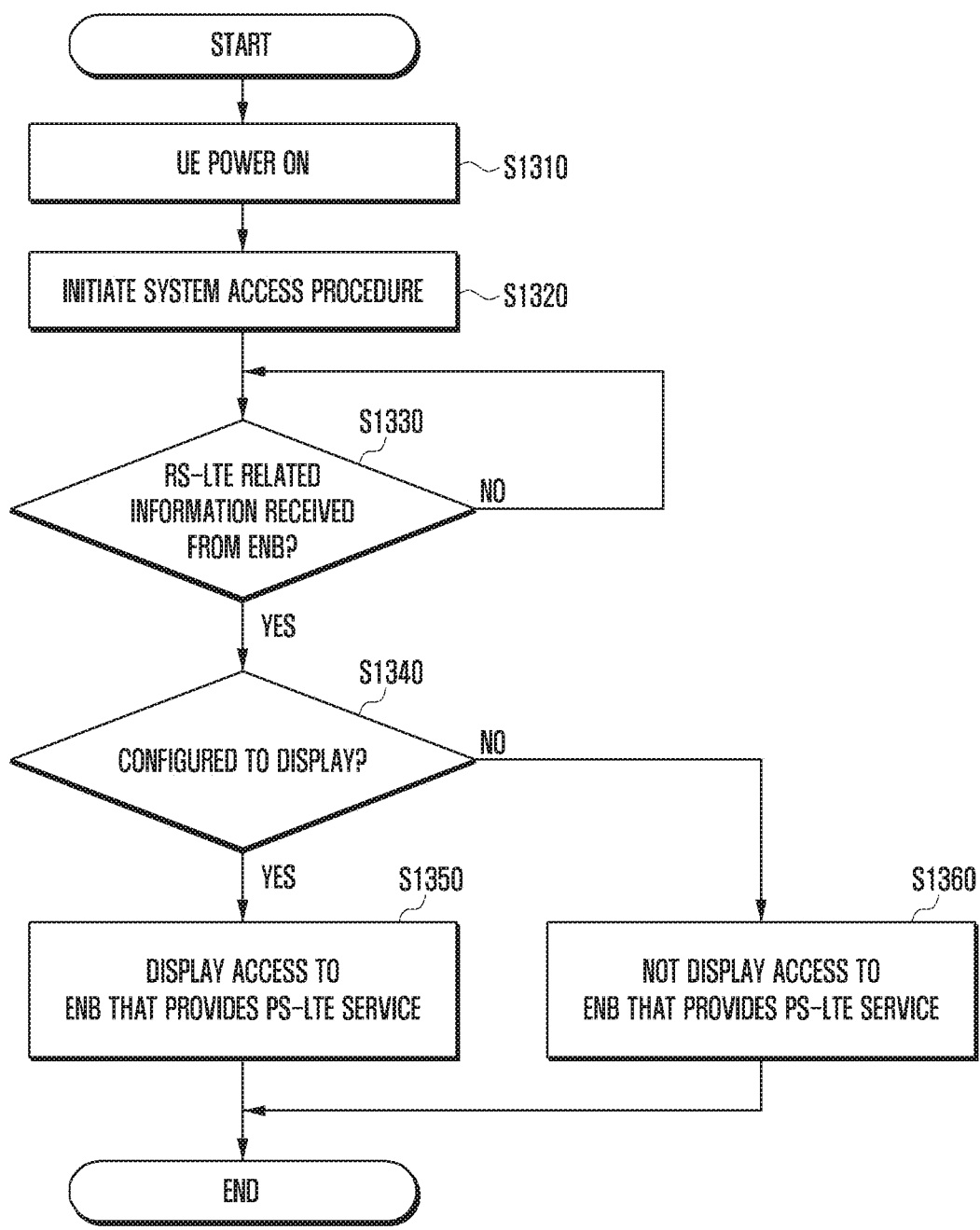
FIG. 13 is a flow diagram illustrating an operation procedure of a terminal according to the ninth embodiment of the present invention.

On the other hand, the above description of FIG. 12 relates to an embodiment in which when the execution of the PS-LTE related application is detected, the UE determines whether it is configured to notify the eNB that it is the PS-LTE UE. However, it is not necessarily limited to this. For example, the UE may skip step S1240 and report immediately to the eNB that the UE is the PS-LTE UE. FIG. 13 is a flow diagram illustrating an operation procedure of a terminal according to the ninth embodiment of the present invention.

The ninth embodiment of the present invention relates to an operation of displaying that a base station (eNB) accessed by a terminal (UE) supports the PS-LTE service, when the UE detects this.

At the outset, at step S1310, the UE detects that the power is turned on. Then, the UE initiates a system access procedure at step S1320. For example, the UE may search for a cell and thereby perform the access procedure for a cell from which the strongest signal is received.

At step 1330, the UE may determine whether PS-LTE related information is received from the eNB. The PS-LTE related information may be an indication that indicates whether the eNB supports the PS-LTE service. Alternatively, the PS-LTE related information may be information on a frequency for providing the PS-LTE service.

The PS-LTE related information may be transmitted from the eNB to the UE through various manners. For example, system information or an RRC message may be used for such transmission. Besides, a message of a physical layer or a MAC layer may be used.

If the UE determines that the PS-LTE related information is received from the eNB, the UE may determine at step S1340 whether it is configured to display the access to the PS-LTE supporting eNB. For this, the UE may check a user setting state such as environment settings. Alternatively, the UE may check a default state configured at the manufacture.

If configured to display, the UE may display at step S1350 that the UE accesses the eNB that provides the PS-LTE service.

If not configured to display, the UE may skip at step S1360 displaying that the UE accesses the eNB that provides the PS-LTE service.

On the other hand, the above description of FIG. 13 relates to an embodiment in which when the PS-LTE related information is received from the eNB, the UE determines whether it is configured to display this. However, it is not necessarily limited to this. For example, the UE may skip step S1340 and display that the UE accesses the eNB that provides the PS-LTE service. In addition, the above description relates to an embodiment in which when the PS-LTE related information is received from the eNB, this is displayed on a display unit. However, it is not necessarily limited to this. In another example, when the PS-LTE related information is received from the eNB, the UE may inquire the user whether to request the eNB to hand over the UE to a frequency band supporting the PS-LTE service.

Figure 14:
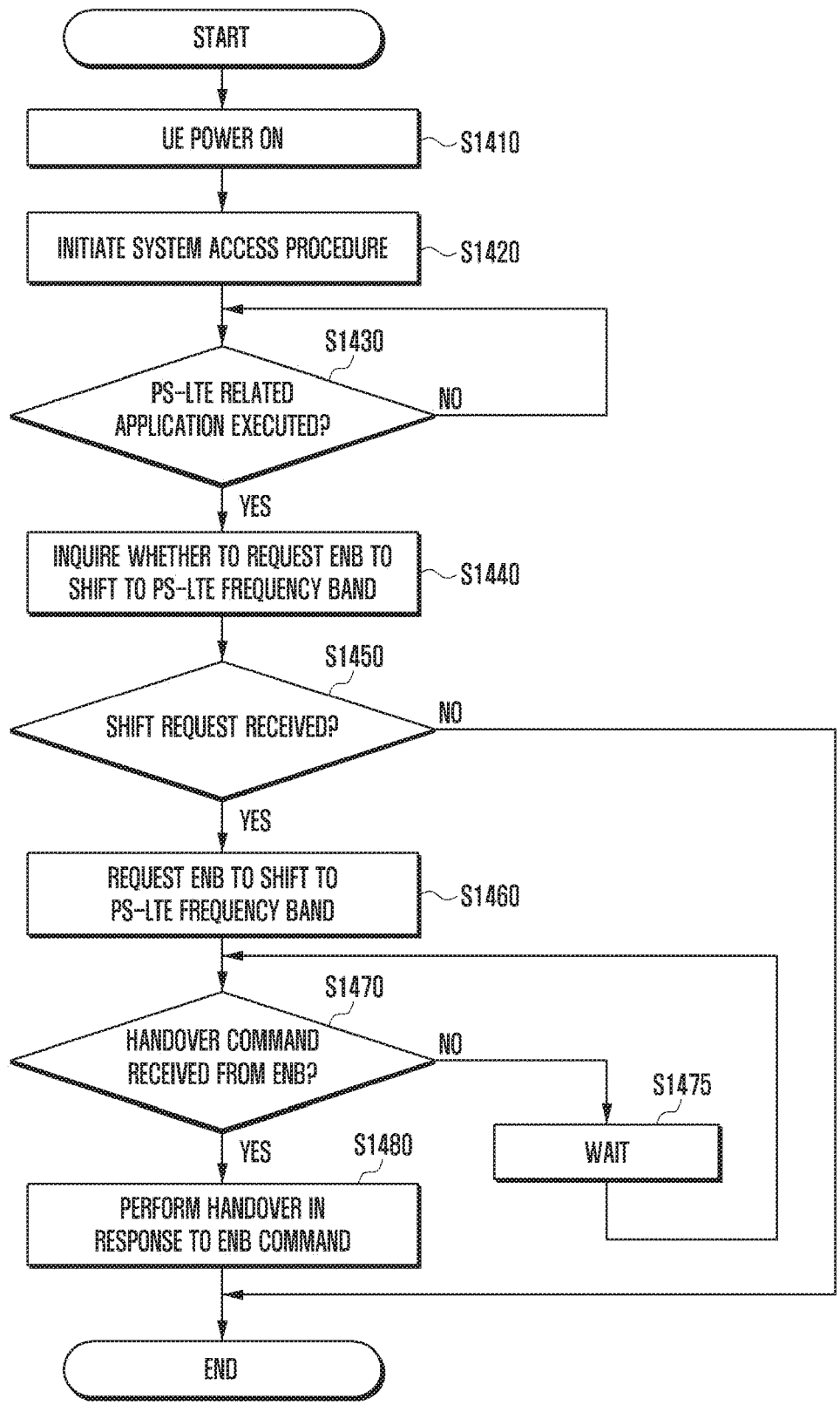
FIG. 14 is a flow diagram illustrating a process of performing a handover to a frequency band in which a PS-LTE service of a terminal is provided, according to the tenth embodiment of the present invention.

FIG. 14 is a flow diagram illustrating a process of performing a handover to a frequency band in which a PS-LTE service of a terminal is provided, according to the tenth embodiment of the present invention.

At the outset, at step S1410, the terminal (UE) detects that the power is turned on. Then, the UE initiates a system access procedure at step S1420. For example, the UE may search for a cell and thereby perform the access procedure for a cell from which the strongest signal is received.

At step 1430, the UE may determine whether the execution of the PS-LTE related application is detected. The PS-LTE related application may include, for example, a voice packet transmission/reception application, a video packet transmission/reception application, a high definition (HD) video call application, a walkie-talkie related application, and the like.

Using category information (classification of finance, movie, music, PS-LTE, etc.), an application identifier (ID), or the like included in a package header of the application, the UE may detect the type of the executed application.

If the execution of the PS-LTE related application is detected, the UE may inquire the user whether to request the eNB to shift to a PS-LTE frequency band.

Then, at step S1450, the UE may determine whether a shift request is received from the user.

If a shift request is received, the UE may request at step S1460 the eNB to shift (e.g., handover) to the PS-LTE frequency band. For this, the UE may request the handover by using a newly defined message format with the eNB. Alternatively, the UE may intentionally set the received signal strength of a current serving frequency to a given value or less and then transmit a measurement report message to the eNB. In this case, the measurement report message may include the received signal strength of the serving frequency and an indication indicating that the UE supports the PS-LTE service.

Also, at step S1470, the UE may determine whether a handover command is received from the eNB. If the handover command is not received, the UE may wait at step S1475 until the handover command is received from the eNB.

If the handover command is received from the eNB, the UE may perform a handover according to the handover command at step S1480. In this case, the handover may be an inter-frequency handover.

Figure 15:
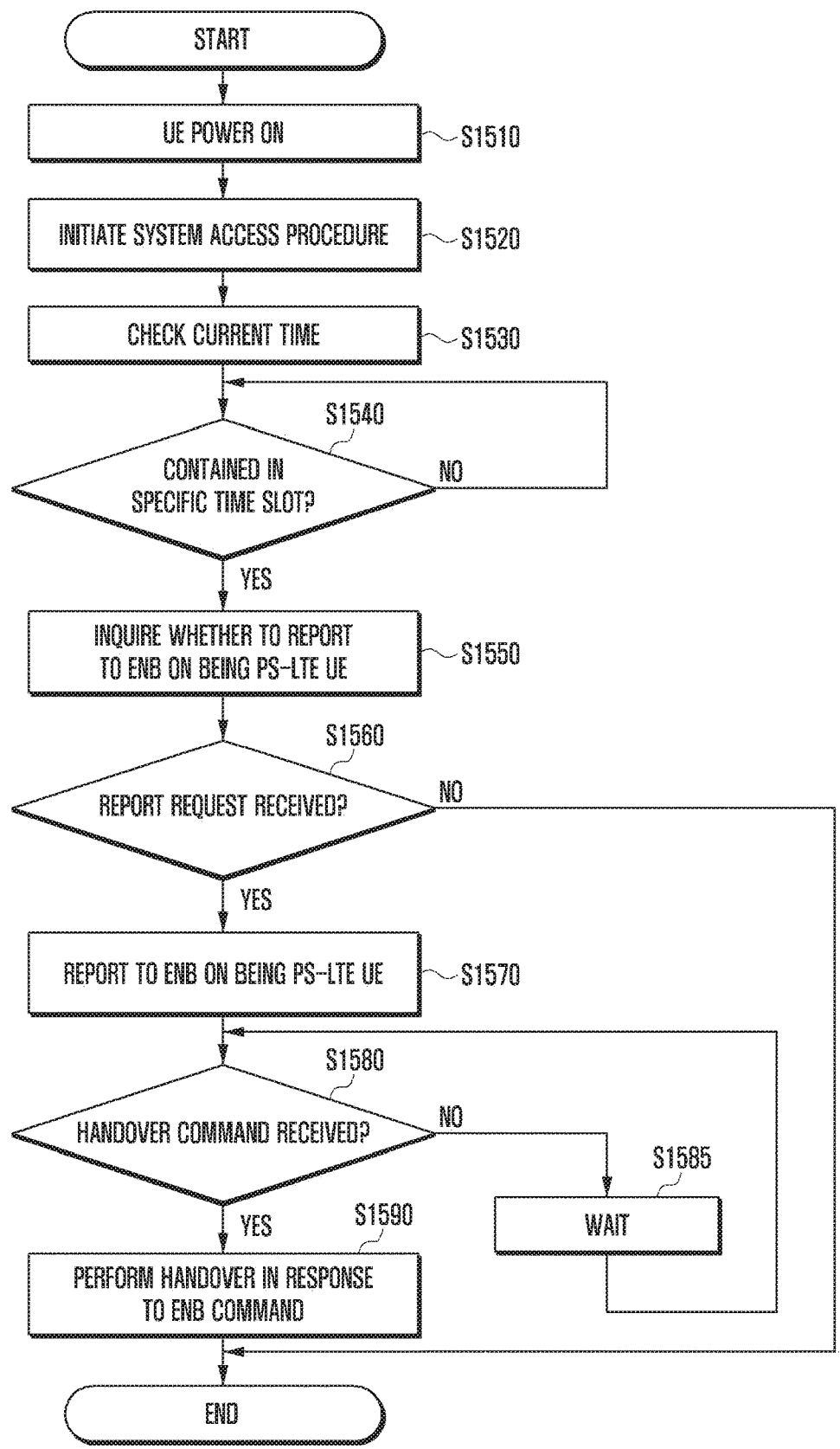
FIG. 15 is a flow diagram illustrating a process of performing a handover to a frequency band in which a PS-LTE service of a terminal is provided, according to the eleventh embodiment of the present invention.

FIG. 15 is a flow diagram illustrating a process of performing a handover to a frequency band in which a PS-LTE service of a terminal is provided, according to the eleventh embodiment of the present invention.

At the outset, at step S1510, the terminal (UE) detects that the power is turned on. Then, the UE initiates a system access procedure at step S1520. For example, the UE may search for a cell and thereby perform the access procedure for a cell from which the strongest signal is received.

At step 1530, the UE may check a current time. Then, at step S1540, the UE may determine whether the current time is contained in a specific time slot.

PS-LTE is a public safety network related service, for example, emergency rescue, radio communication in case of disaster, or the like. A user who uses the PS-LTE UE may be, for example, a firefighter, a police officer, a doctor, a nurse, or the like. While they are likely to use their own terminals for public safety network related services during working hours, they are likely to use their own terminals for their private lives during off hours.

Thus, in the eleventh embodiment of the present invention, the UE may determine whether the current time corresponds to a specific time, e.g., a user's working time. A detailed method for statistically determining whether the current time corresponds to a user's working time will be described later.

If the current time is contained in the specific time slot, the UE may inquire at step S1550 the user whether to report to the eNB on that it is the PS-LTE UE.

Then, at step S1560, the UE may determine whether a report request is received from the user. If received, the UE may report at step 1570 to the eNB on that it is the PS-LTE UE.

This reporting method may not be limited to a specific one. For example, a radio resource control (RRC) message may be used for this reporting. Alternatively, a UE capability message may be used for this reporting. Alternatively, for this reporting, the UE and the eNB may define a new message.

The above description relates to an embodiment in which when the current time corresponds to a specific time, the UE reports to the eNB on that it is the PS-LTE UE. However, it is not necessarily limited to this.

In another embodiment, the UE may request the eNB to shift (e.g., handover) to the PS-LTE frequency band. For this, the UE may request the handover by using a newly defined message format with the eNB. Alternatively, the UE may intentionally set the received signal strength of a current serving frequency to a given value or less and then transmit a measurement report message to the eNB. In this case, the measurement report message may include the received signal strength of the serving frequency and an indication indicating that the UE supports the PS-LTE service.

At step S1580, the UE may determine whether a handover command is received from the eNB. If the handover command is not received, the UE may wait at step S1585 until the handover command is received from the eNB.

If the handover command is received from the eNB, the UE may perform a handover according to the handover command at step S1590. In this case, the handover may be an inter-frequency handover.

Figure 16:
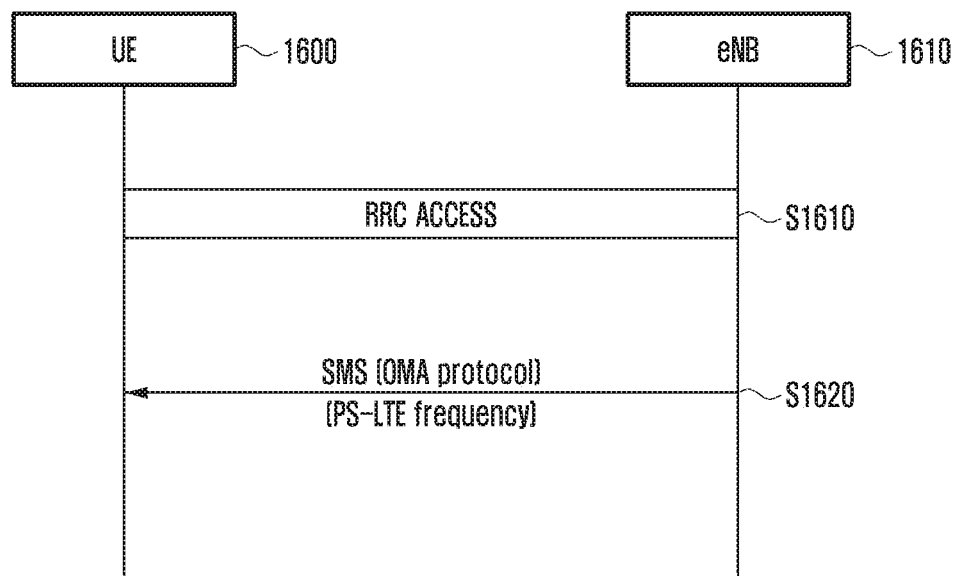
FIG. 16 is a flow diagram illustrating a process for a base station to notify PS-LTE related information to a terminal, according to the twelfth embodiment of the present invention.

FIG. 16 is a flow diagram illustrating a process for a base station to notify PS-LTE related information to a terminal, according to the twelfth embodiment of the present invention.

First, at step S1610, the terminal (UE) 1600 may perform an RRC access procedure with the base station (eNB) 1610. The RRC access procedure may include a procedure in which the UE 1600 and the eNB 1610 exchange RRC connection messages.

Thereafter, at step S1620, the eNB 1610 may transmit an SMS message according to the OMA protocol to the UE 1600. The SMS message may include PS-LTE related information.

According to an embodiment of the present invention, the PS-LTE related information may be an indication that indicates that the eNB 1610 supports the PS-LTE service.

Alternatively, according to another embodiment of the present invention, the PS-LTE related information may include information on a frequency band that supports the PS-LTE service on the eNB 1610.

Figure 17:
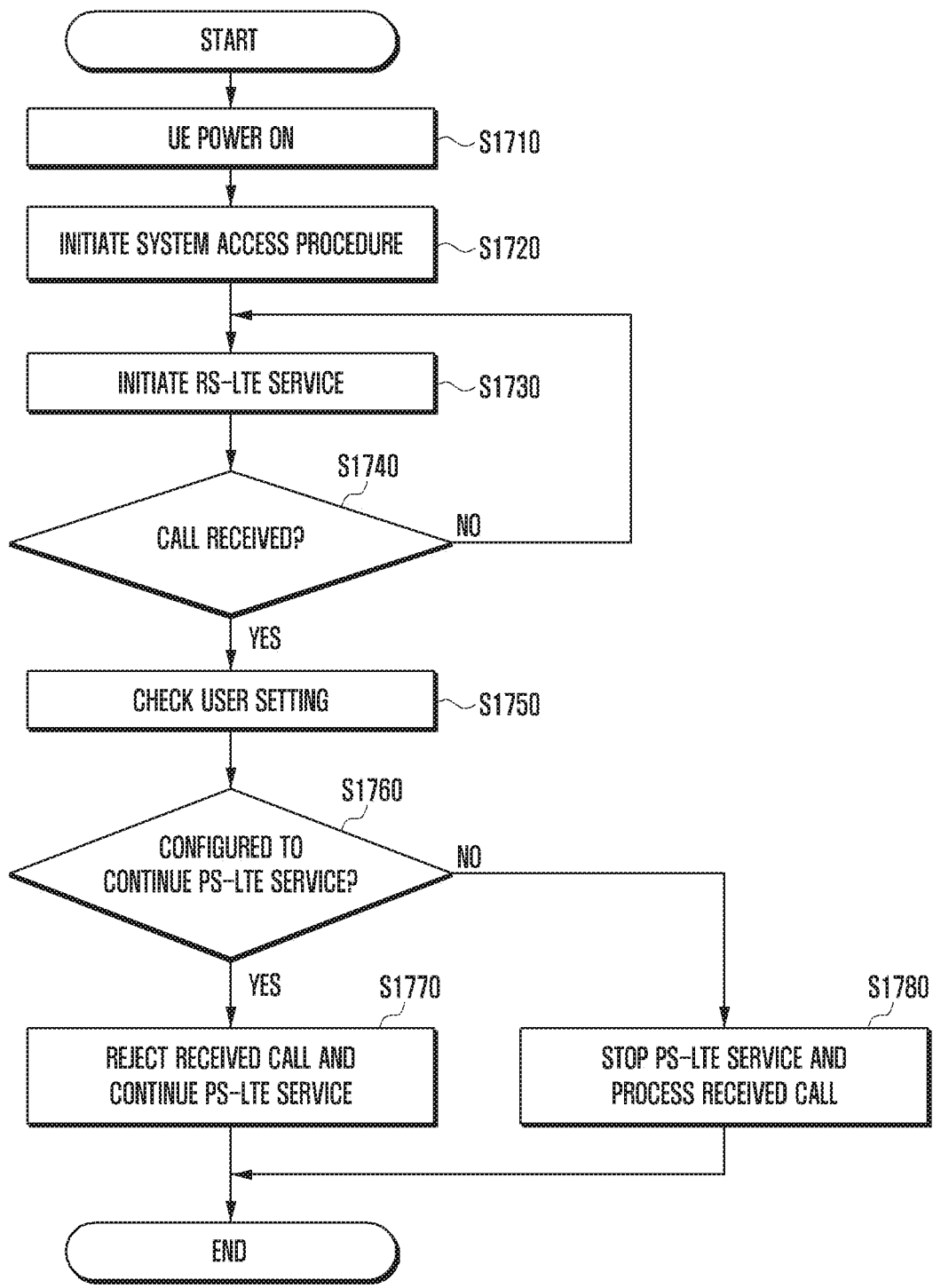
FIG. 17 is a flow diagram illustrating a method for processing a received call during a PS-LTE service, according to the thirteenth embodiment of the present invention.

FIG. 17 is a flow diagram illustrating a method for processing a received call during a PS-LTE service, according to the thirteenth embodiment of the present invention.

At the outset, at step S1710, a terminal (UE) detects that the power is turned on. Then, the UE initiates a system access procedure at step S1720. For example, the UE may search for a cell and thereby perform the access procedure for a cell from which the strongest signal is received.

At step S1730, the UE may detect that the PS-LTE related service is initiated. For example, UE may detect that a PS-LTE related application is executed. Using category information (classification of finance, movie, music, PS-LTE, etc.), an application identifier (ID), or the like included in a package header of the application, the UE may detect the type of the executed application.

Then, at step S1740, the UE may determine whether a call is received. For this, the UE may determine through a circuit switched (CS) manner whether a call is received. This may include a case where a call is received through the 3G communication network such as WCDMA while the UE is using the LTE service. Alternatively, the UE may determine through a packet switched manner whether a call is received. This may include a case where a call is received through the LTE communication network such as VoIMS while the UE is using the LTE service.

If it is determined that the call is received, the UE may check a user setting at step S1750.

Then, at step S1760, the UE may determine whether the PS-LTE service is configured to continue even if the call is received during the PS-LTE service.

If the PS-LTE service is configured to continue even if the call is received during the PS-LTE service, the UE rejects the received call at step S1770. Then, the UE may continue the PS-LTE service.

On the other hand, if the PS-LTE service is configured to stop when the call is received during the PS-LTE service, the UE stops the PS-LTE service at step S1780. Then, the UE may perform a procedure for connection to the received call.

Figure 18:
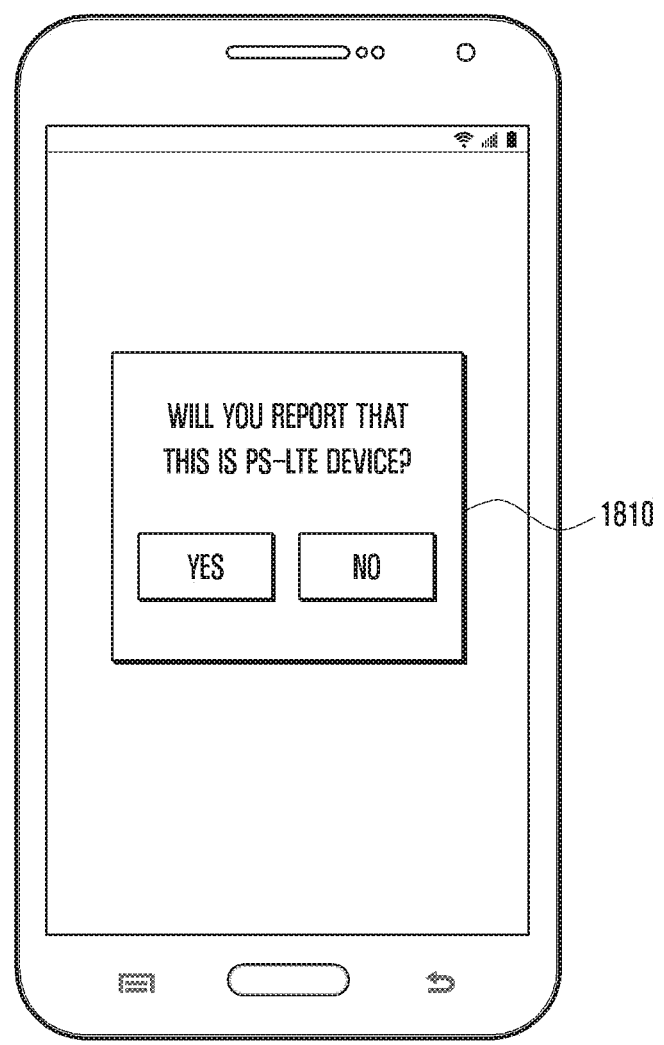
FIG. 18 is a diagram illustrating an operation for a terminal to display PS-LTE related information according to the fourteenth embodiment of the present invention.

FIG. 18 is a diagram illustrating an operation for a terminal to display PS-LTE related information according to the fourteenth embodiment of the present invention.

In the fourteenth embodiment of the present invention, when the terminal (UE) initially accesses the system, a method for displaying through a user interface whether to notify a base station (eNB) that the UE is the PS-LTE UE or UE that supports the PS-LTE service is described.

As shown in FIG. 18, when the UE initially accesses the system, the UE may inquire through a notification area 1810 the user to report to the eNB on that it is the PS-LTE UE or the PS-LTE service supportable UE. The notification area 1810 may include a positive icon and a negative icon.

If the UE receives a positive reply from the user, the UE may report to the eNB on that it is the PS-LTE UE. As described above, this reporting may be performed through a radio resource control (RRC) message. Alternatively, a UE capability message may be used for this reporting. Alternatively, for this reporting, the UE and the eNB may define a new message.

Figure 19:
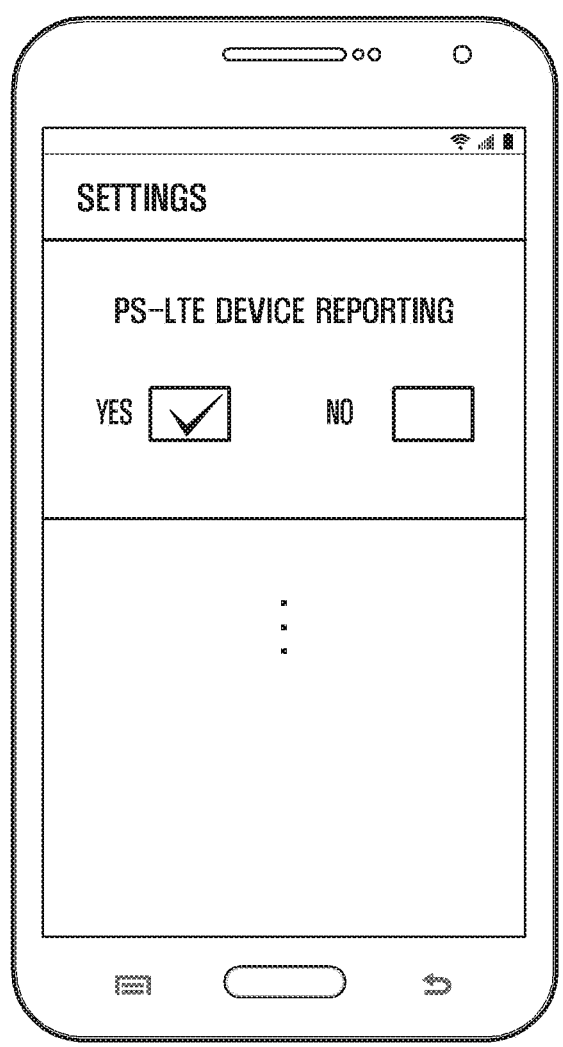
FIG. 19 is a diagram illustrating an operation for a terminal to display PS-LTE related information according to the fifteenth embodiment of the present invention.

FIG. 19 is a diagram illustrating an operation for a terminal to display PS-LTE related information according to the fifteenth embodiment of the present invention.

In the fifth embodiment of the present invention, when the terminal (UE) initially accesses the system, a user interface for setting whether to automatically notify a base station (eNB) that the UE is the PS-LTE UE or UE that supports the PS-LTE service is described.

As shown in FIG. 18, a setting menu may be used to automatically notify the eNB that the UE is the PS-LTE UE or UE that supports the PS-LTE service.

If set to positive, when initially accessing the system, the UE may automatically notify the eNB that the UE is the PS-LTE UE or UE that supports the PS-LTE service.

On the other hand, if set to negative, when initially accessing the system, the UE may omit an operation of notifying the eNB that the UE is the PS-LTE UE or UE that supports the PS-LTE service.

FIG. 20 is a diagram illustrating an example for a terminal to collect PS-LTE related information according to the sixteenth embodiment of the present invention.

According to an embodiment of the present invention, as described above, the terminal (UE) may transmit and receive the PS-LTE related information to and from a base station (eNB) only for working hours of a user using the PS-LTE UE. Therefore, it is necessary to collect and analyze statistical data for checking the working hours of the user using the PS-LTE UE.

In the sixteenth embodiment of the present invention, an example of collecting and analyzing statistical data for checking the working hours of the user is described.

In FIG. 20, the term "connected" may refer to access to a PS-LTE related service, and the term "disconnected" may refer to no access to the PS-LTE related service. Alternatively, the term "connected" may mean that a PE-LTE application is running, and the term "disconnected" may mean that the PS-LTE related application is not running.

Referring to FIG. 20, on Monday, it can be seen that the disconnected state is from 6:00 to 8:00 and after 19:00 and the connected state is from 8:00 to 19:00. In this case, the UE may analyze that the working hours of the user are from 8:00 to 19:00 on Monday.

Likewise, on Tuesday, it can be seen that the disconnected state is from 6:00 to 8:00 and after 19:00 and the connected state is from 8:00 to 19:00. In this case, the UE may analyze that the working hours of the user are from 8:00 to 19:00 on Tuesday.

On the other hand, on Wednesday, it can be seen that the connected state is from 6:00 to 17:00 and the disconnected state is after 17:00. In this case, the UE may analyze that the working hours of the user are from 6:00 to 17:00 on Wednesday.

On Thursday, it can be seen that the connected state is from 6:00 to 17:00 and the disconnected state is after 17:00. In this case, the UE may analyze that the working hours of the user are from 6:00 to 17:00 on Thursday.

The UE may estimate the user's working time, based on the collected statistical data in the same manner as the above example.

Therefore, based on the current time and the estimated working time, the UE may determine whether to report to the eNB on that it is the PS-LTE terminal.

Figure 21:
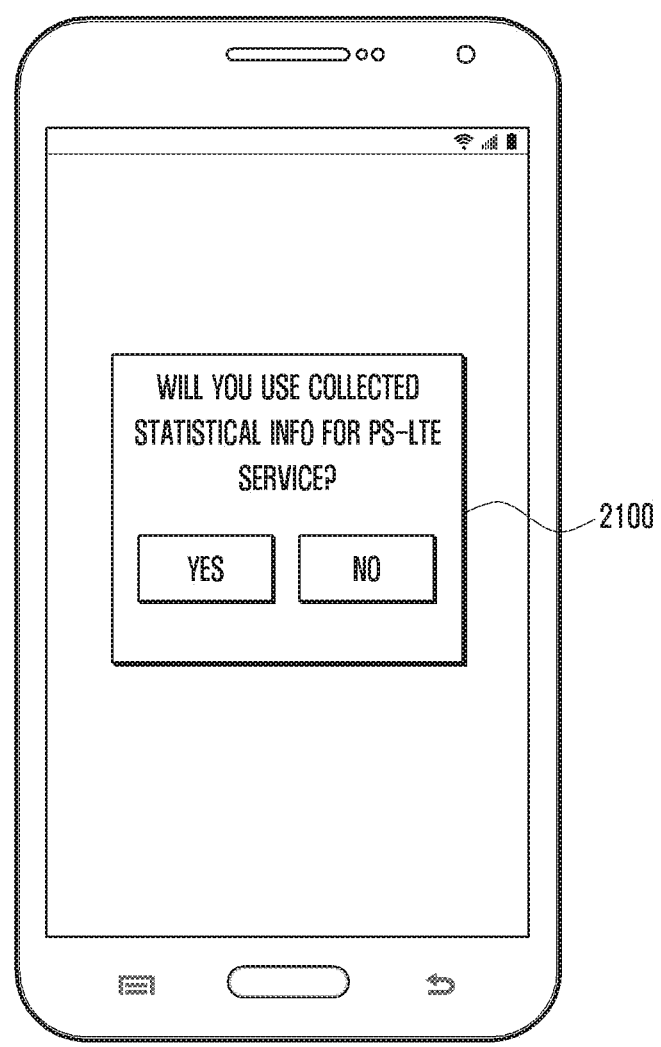
FIG. 21 is a diagram illustrating an operation for a terminal to display PS-LTE related information according to the seventeenth embodiment of the present invention.

FIG. 21 is a diagram illustrating an operation for a terminal to display PS-LTE related information according to the seventeenth embodiment of the present invention.

As described above, according to an embodiment of the present invention, the PS-LTE related information may be transmitted to and received from the eNB only for the working time of the user using the PS-LTE UE. For this, the UE may collect information related to user's PS-LTE related information, e.g., a PS-LTE service access time, whether a PS-LTE related application is executed, and the like.

In the seventeenth embodiment of the present invention, a user interface for the UE to inquire the user whether to link the collected information to the use of the PS-LTE service is described.

As shown in FIG. 21, through a notification area 2100, the UE may inquire the user whether to link the collected information to the use of the PS-LTE service. The notification area 2100 may include a positive icon and a negative icon.

If the UE receives a positive reply from the user, the UE may decide to link the collected information to the use of the PS-LTE service. Therefore, the UE may estimate the working time of the user. Then, based on the current time and the estimated working time, the UE may determine whether to report to the eNB on that it is the PS-LTE UE.

On the other hand, if the UE receives a negative reply from the user, the UE may decide not to link the collected information to the use of the PS-LTE service.

Figure 22:
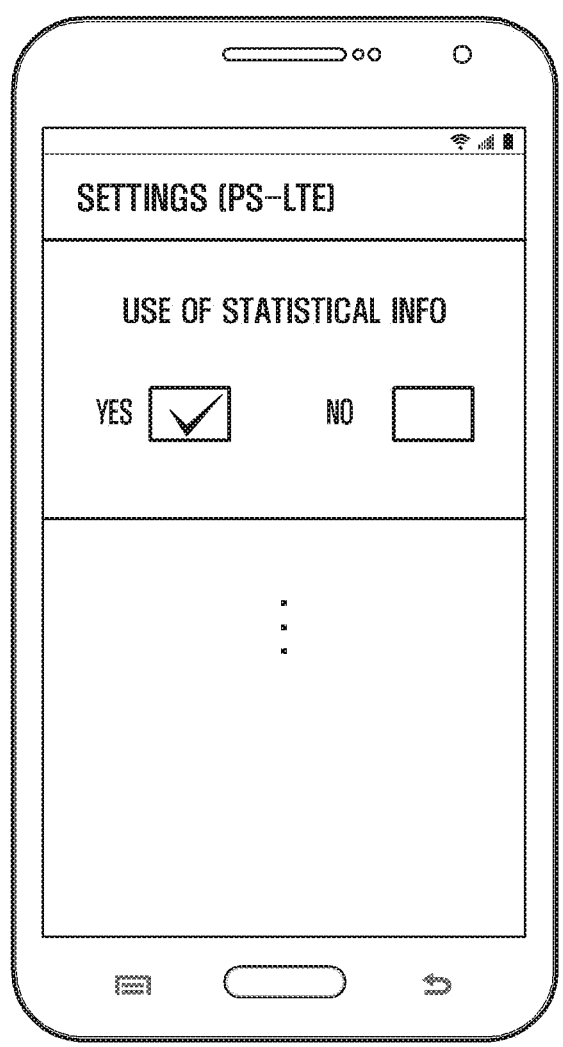
FIG. 22 is a diagram illustrating an operation for a terminal to display PS-LTE related information according to the eighteenth embodiment of the present invention.

FIG. 22 is a diagram illustrating an operation for a terminal to display PS-LTE related information according to the eighteenth embodiment of the present invention.

In the eighteenth embodiment of the present invention, a user interface for setting whether to link the collected information to the use of the PS-LTE service is described.

As shown in FIG. 22, a setting menu may be used for the UE to configure whether to link the collected information to the use of the PS-LTE service.

If set to positive, the UE may decide to link the collected information to the use of the PS-LTE service. Therefore, the UE may estimate the working time of the user. Then, based on the current time and the estimated working time, the UE may determine whether to report to the eNB on that it is the PS-LTE UE.

On the other hand, if set to negative, the UE may decide not to link the collected information to the use of the PS-LTE service.

Figure 23:
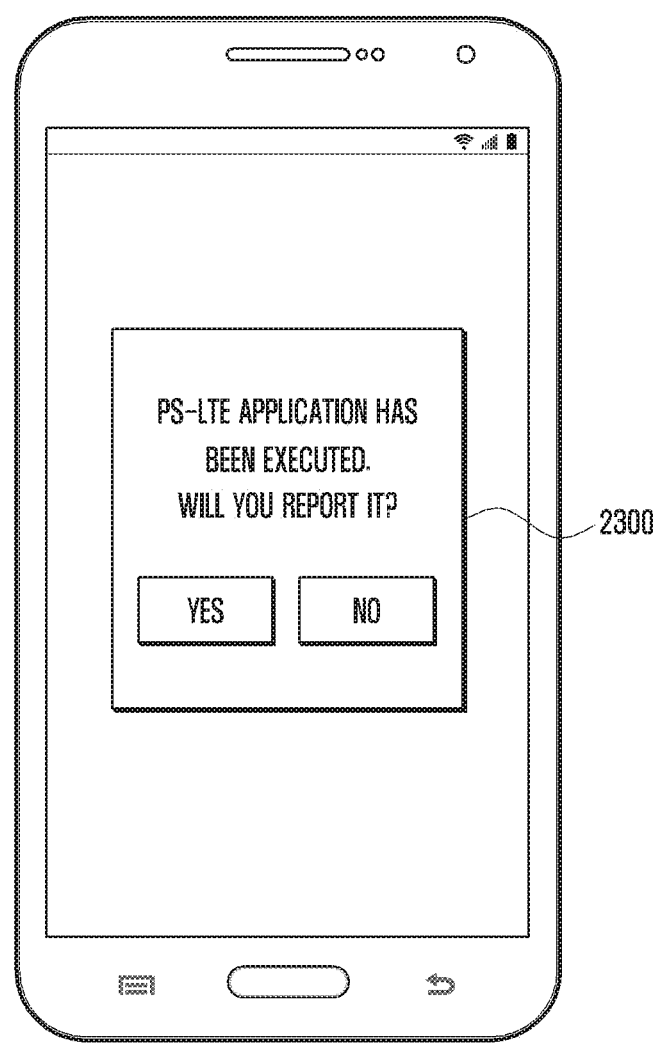
FIG. 23 is a diagram illustrating an operation for a terminal to display PS-LTE related information according to the nineteenth embodiment of the present invention.

FIG. 23 is a diagram illustrating an operation for a terminal to display PS-LTE related information according to the nineteenth embodiment of the present invention.

In the nineteenth embodiment of the present invention, when the terminal (UE) detects that a PS-LTE related application is executed, a method for displaying through a user interface whether to notify this to a base station (eNB) is described.

As shown in FIG. 23, when the UE detects that the PS-LTE related application is executed, the UE may inquire through a notification area 2300 the user whether to notify this to the eNB. The notification area 2300 may include a positive icon and a negative icon.

If the UE receives a positive reply from the user, the UE may notify the eNB that it is the PS-LTE UE. As described above, this notification may be performed through a radio resource control (RRC) message. Alternatively, a UE capability message may be used for this notification. Alternatively, for this notification, the UE and the eNB may define a new message.

On the other hand, if the UE receives a negative reply from the user, the UE may omit an operation of notifying the eNB that it is the PS-LTE UE.

Figure 24:
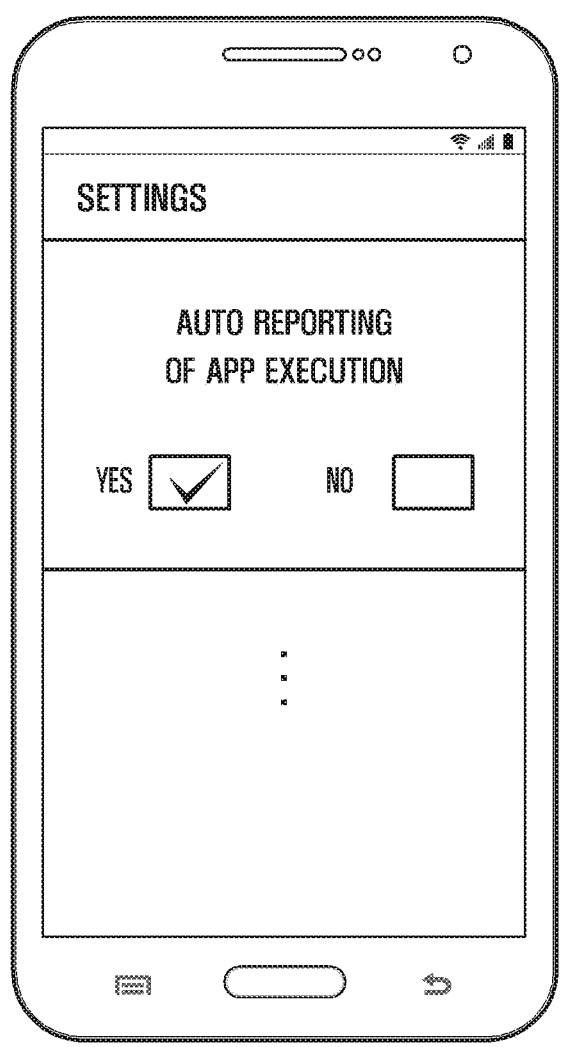
FIG. 24 is a diagram illustrating an operation for a terminal to display PS-LTE related information according to the twentieth embodiment of the present invention.

FIG. 24 is a diagram illustrating an operation for a terminal to display PS-LTE related information according to the twentieth embodiment of the present invention.

In the twentieth embodiment of the present invention, when the terminal (UE) detects that a PS-LTE related application is executed, a user interface for setting whether to notify this to a base station (eNB) is described.

As shown in FIG. 24, a setting menu may be used for the UE to configure whether to notify the execution of the PS-LTE related application to the eNB.

If set to positive, and when the UE detects the execution of the PS-LTE related application, the UE may automatically notify the eNB that it is the PS-LTE UE or the UE that supports the PS-LTE service.

On the other hand, if set to negative, even if the UE detects the execution of the PS-LTE related application, the UE may omit an operation of notifying the eNB that it is the PS-LTE UE or the UE that supports the PS-LTE service.

Figure 25:
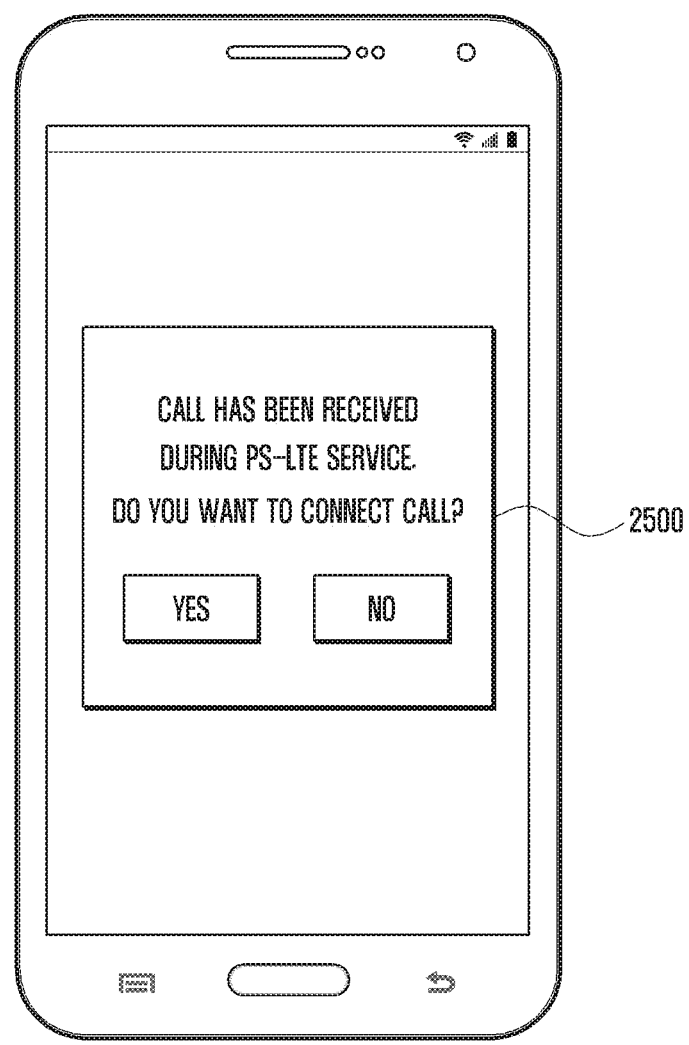
FIG. 25 is a diagram illustrating an operation for a terminal to display PS-LTE related information according to the twenty-first embodiment of the present invention.

FIG. 25 is a diagram illustrating an operation for a terminal to display PS-LTE related information according to the twenty-first embodiment of the present invention.

In the twenty-first embodiment of the present invention, when the terminal (UE) receives a call during the use of a PS-LTE service, a method for displaying through a user interface whether to connect the received call is described.

As shown in FIG. 25, when the UE receives a call during the PS-LTE service, the UE may inquire through a notification area 2500 the user whether to connect the received call. The notification area 2500 may include a positive icon and a negative icon.

If the UE receives a positive reply from the user, the UE may stop the PS-LTE service and perform a procedure of connecting the received call.

On the other hand, if the UE receives a negative reply from the user, the UE may reject the received call.

Figure 26:
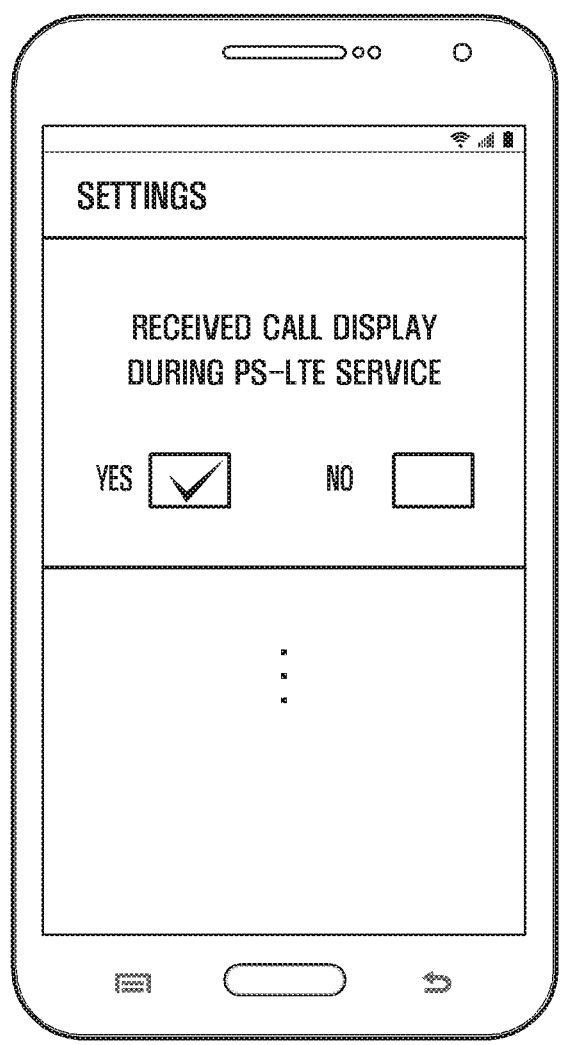
FIG. 26 is a diagram illustrating an operation for a terminal to display PS-LTE related information according to the twenty-second embodiment of the present invention.

FIG. 26 is a diagram illustrating an operation for a terminal to display PS-LTE related information according to the twenty-second embodiment of the present invention.

In the twenty-second embodiment of the present invention, when the terminal (UE) receives a call during the use of a PS-LTE service, a method for displaying through a user interface whether to connect the received call is described.

As shown in FIG. 26, a setting menu may be used for the UE to configure whether to connect the received call when a call is received during the PS-LTE service.

If set to positive, and when a call is received during the PS-LTE service, the UE may stop the PS-LTE service and perform a procedure of connecting the received call.

On the other hand, if set to negative, and when a call is received during the PS-LTE service, the UE may reject the received call.

While various embodiments are described above, the embodiments are not necessarily performed independently. For example, the first embodiment may be applied to the process of reporting the UE capability information to the eNB, and the second embodiment may be continuously applied to a case where an application for starting a public safety network service is executed after the UE accesses the eNB. Of course, the UE operation of receiving the SIB15 may be performed in any process after the UE camps on the eNB.

Figure 27:
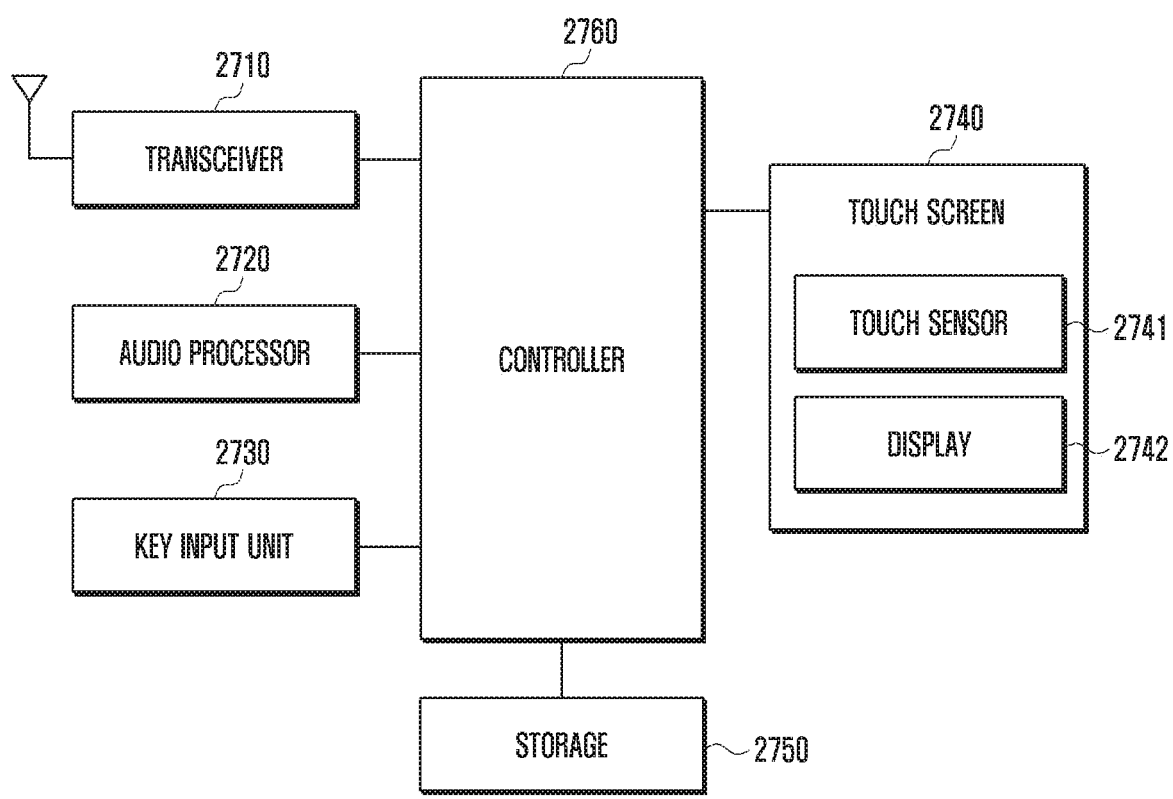
FIG. 27 is a block diagram illustrating an internal structure of a terminal according to an embodiment of the present invention.

FIG. 27 is a block diagram illustrating an internal structure of a terminal according to an embodiment of the present invention. As shown in FIG. 27, the terminal according to an embodiment of the present invention may include a transceiver 2710, an audio processor 2720, a key input unit 2730, a touch screen 2740, a storage 2750, and a controller 2760.

The transceiver 2710 performs a transmission/reception function of data for wireless communication of the terminal. The transceiver 2710 may include an RF transmitter for up-converting and amplifying the frequency of a transmitted signal, and an RF receiver for low-noise amplifying the received signal and down-converting the frequency. The transceiver 2710 may receive data via a wireless channel, output the received data to the controller 2760, and transmit data outputted from the controller 2760 through a wireless channel.

The audio processor 2720 may be formed of a CODEC, which may be composed of a data codec for processing packet data and an audio codec for processing audio signals such as voice. The audio processor 2720 converts a digital audio signal into an analog audio signal through the audio codec and reproduces it through a speaker (SPK). Also, the audio processor 2720 converts an analog audio signal inputted from a microphone (MIC) into a digital audio signal through the audio codec.

The key input unit 2730 receives a user's key manipulation for controlling the terminal, generates an input signal, and transmits the input signal to the controller 2760. The key input unit 2730 may be formed of a keypad including alphanumeric keys and navigation keys, and may also have a certain function key on sides of the terminal. The key input unit 2730 may be omitted in case of a mobile terminal which can be operated by only the touch screen 2740 according to the embodiment of the present invention.

The touch screen 2740 may include a touch sensor 2741 and a display 2742. The touch sensor 2741 senses a user's touch input. The touch sensor 2741 may be formed of a touch-sensitive sensor of a capacitive overlay type, a pressure type, a resistive overlay type, or an infrared beam type, or formed of a pressure sensor. In addition to the above sensors, any type of sensor device capable of sensing contact or pressure of an object may be used for the touch sensor 2741 of the present invention. The touch sensor 2741 senses a user's touch input, generates a sensing signal, and transmits the sensing signal to the controller 2760. The sensing signal includes coordinate data inputted by the user. When the user enters a touch and drag input, the touch sensor 2741 generates sensing signals including coordinate data of a touch and drag path and transmits the sensing signals to the controller 2760. For example, the touch sensor 2741 may transmit a user's positive or negative input to the controller 2760.

The display 2742 may be formed of a liquid crystal display (LCD), an organic light emitting diode (OLED), an active matrix organic light emitting diode (AMOLED), and the like. The display 2742 visually provides a menu of the terminal (the above-described user interface, etc.), input data, function setting information, and any other information to the user. The display 2742 outputs a booting screen, an idle screen, a menu screen, a call screen, and other application screens of the terminal.

The terminal of the present invention may include the touch screen as described above, but it should be noted that embodiments of the present invention are not necessarily applied to such a terminal having the touch screen. When the present invention is applied to a mobile terminal having no touch screen, the touch screen 2740 shown in FIG. 27 may be modified to perform only the function of the display 2742.

The storage 2750 stores programs and data necessary for the operation of the terminal, and may be divided into a program region and a data region. The program region may store a program for controlling the overall operation of the terminal, an operating system (OS) for booting the terminal, an application program necessary for reproducing multimedia contents, and other optional functions of the terminal such as a camera function, a sound playback function, an image or video playback function, and the like. The data region may store various kinds of data, generated according to the use of the terminal, such as images, videos, phone books, audio data, and the like.

The controller 2760 may control a signal flow between each block so that the terminal can perform operations according to embodiments of the present invention.

The controller 2760 according to an embodiment of the present invention may transmit a message including public safety network related information to the base station and determine whether a handover command is received from the base station in response to the message. In addition, when receiving the handover command, the controller 2760 may perform a handover to a frequency band that supports a public safety network service.

In addition, the controller 2760 may control the terminal to transmit, to the base station, a terminal capability information message including an indication indicating that the terminal supports the public safety network service.

In addition, the controller 2760 may determine whether the execution of an application for starting the public safety network service is detected. When detected, the controller 2760 may control transmitting, to the base station, an indication for requesting a handover to a frequency band that supports the public safety network service.

In addition, the controller 2760 may control receiving, from the base station, a system information block including information on a frequency band that supports the public safety network service. In this case, the system information block may include a system information block 15.

Figure 28:
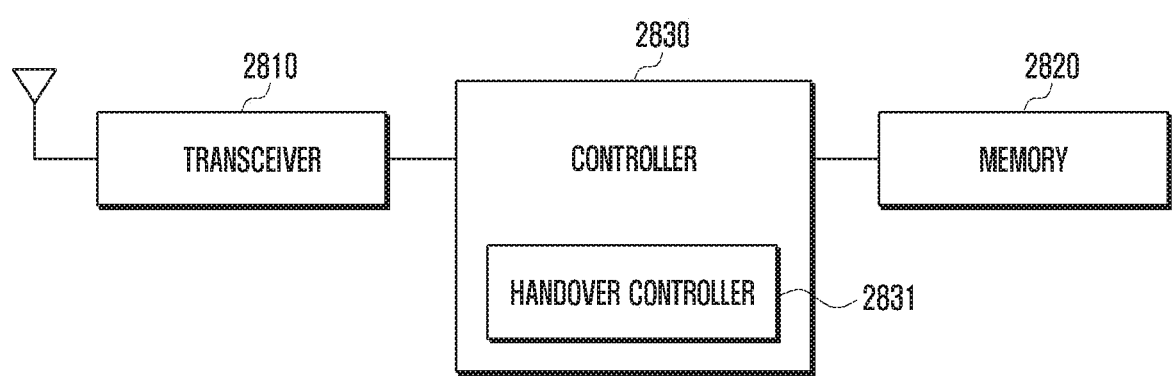
FIG. 28 is a block diagram illustrating an internal structure of a base station according to an embodiment of the present invention.

FIG. 28 is a block diagram illustrating an internal structure of a base station according to an embodiment of the present invention.

As shown in FIG. 28, the base station of the present invention may include a transceiver 2810, a memory 2820, and a controller 2830.

The transceiver 2810 may provide a means for transmitting and receiving signals to and from a terminal or a core node of the wireless communication system. For example, when the base station transmits and receives a signal to and from the terminal, the transceiver 2810 forms a wireless channel between the base station and the terminal to transmit and receive a signal. Meanwhile, when the base station transmits and receives a signal to and from the core node, the transceiver 2810 provides a wired interface to transmit and receive a signal.

The memory 2820 may include a volatile memory or a nonvolatile memory, and may store programs necessary for the operation of the base station.

The controller 2830 may control a signal flow between each block so that the base station can perform operations according to embodiments of the present invention. According to an embodiment of the present invention, the controller 2830 may include a handover controller 2831.

The controller 2830 according to an embodiment of the present invention may control a series of processes for receiving a message including public safety network related information from the terminal. Based on this message, the handover controller 2831 may determine whether it is necessary to hand over the terminal to a frequency band that supports the public safety network service. When the handover is required, the handover controller 2831 may control transmitting, to the terminal, a handover command message to hand over the terminal to the frequency band supporting the public safety network service.

In addition, the controller 2830 may control the terminal to receive a terminal capability information message including an indication indicating that the terminal supports the public safety network service.

In addition, when the execution of an application for starting the public safety network service is detected, the controller 2830 may control receiving, from the terminal, an indication for requesting a handover to the frequency band supporting the public safety network service.

In addition, the controller 2830 may generate a system information block including information on a frequency band supporting the public safety network service, and may control broadcasting the generated system information block. In this case, the system information block may include a system information block 15.

Although the controller 2830 and the handover controller 2831 are described as being divided into separate blocks and performing different functions, the present invention is not limited thereto. For example, the controller 2830 may directly perform a function performed by the handover controller 2831.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. A method performed by a terminal for accessing a public safety network in a wireless communication system, the method comprising:
   receiving, from a base station during a random access procedure, information indicating that the base station supports a public safety network service;
   determining whether execution of an application associated with the public safety network service is detected based on category information included in a packet of the application;
   identifying whether the terminal is configured to notify that the terminal supports the public safety network service, in case that the execution of the application associated with the public safety network service is detected;
   transmitting, to the base station, a message including terminal capability information indicating that the terminal supports the public safety network service, in case that the terminal is configured to notify that the terminal supports the public safety network service;
   receiving, from the base station, a handover command message, in case that the terminal support the public safety network service and a serving frequency band of the terminal and a frequency band that supports the public safety network service are different; and
   performing a handover, in case that the handover command message is received, to the frequency band that supports the public safety network service.

2. The method of claim 1, further comprising:
   in case that the execution of the application associated with the public safety network service is detected, transmitting, to the base station, an indication for requesting a handover to the frequency band that supports the public safety network service.

3. The method of claim 1, further comprising:
   receiving, from the base station, a system information block including information on the frequency band that supports the public safety network service,
   wherein the system information block includes a system information block 15.

4. The method of claim 1, wherein the transmitting the message includes:
   displaying a notification area for inquiring whether to transmit a message including the public safety network related information to the base station, and transmitting a message including the public safety network related information to the base station when a positive reply is received through the notification area; or checking a current time, and transmitting a message including the public safety network related information to the base station when the current time is contained in a specific time slot.

5. The method of claim 1, further comprising:
determining that the base station supports the public safety network service based on the information indicating that the base station supports a public safety network service; and
in case that the base station supports the public safety network service, displaying notification information informing of support;
detecting a received call during the public safety network service; and
processing the received call, based on a user setting.

6. A method performed by a base station for supporting a public safety network access of a terminal in a wireless communication system, the method comprising:
transmitting, to a terminal during a random access procedure, information indicating that the base station supports a public safety network service;
receiving, from the terminal, a message including terminal capability information indicating that the terminal supports a public safety network service, in case that execution of an application associated with the public safety network service is detected based on category information included in a packet of the application and the terminal is configured to notify that the terminal supports the public safety network service;
determining whether a serving frequency band of the terminal and a frequency band that supports the public safety network service are different;
determining, based on the message, to perform a hand over the terminal to a frequency band that supports the public safety network service in case that the terminal support the public safety network service and the serving frequency band of the terminal and the frequency band that supports the public safety network service are different; and
transmitting, to the terminal, a handover command to hand over the terminal to the frequency band that supports the public safety network service, based on the determination.

7. The method of claim 6, further comprising:
in case that the execution of the application associated with the public safety network service is detected at the terminal, receiving, from the terminal, an indication for requesting a handover to the frequency band that supports the public safety network service.

8. The method of claim 6, further comprising:
generating a system information block including information on the frequency band that supports the public safety network service; and
broadcasting the generated system information block, wherein the system information block includes a system information block 15.

9. A terminal for accessing a public safety network in a wireless communication system, the terminal comprising:
a transceiver configured to transmit and receive a signal to and from a base station; and
a controller configured to:
control the transceiver to receive, from a base station during a random access procedure, information indicating that the base station supports a public safety network service, to determine whether execution of an application associated with the public safety network service is detected based on category information included in a packet of the application, to identify whether the terminal is configured to notify that the terminal supports the public safety network service, in case that the execution of the application associated with the public safety network service is detected, to control the transceiver to transmit, to the base station, a message including terminal capability information indicating that the terminal supports the public safety network service, in case that the terminal is configured to notify that the terminal supports the public safety network service, and receive, from the base station, a handover command message, in case that the terminal support the public safety network service and a serving frequency band of the terminal and a frequency band that supports the public safety network service are different, and to perform a handover, in case that the handover command message is received, to a frequency band that supports the public safety network service.

10. The terminal of claim 9, wherein the controller is further configured to:
in case that the execution of the application associated with the public safety network service is detected, control the transceiver to transmit, to the base station, an indication for requesting a handover to the frequency band that supports the public safety network service.

11. The terminal of claim 9, wherein the controller is further configured to:
control the transceiver to receive, from the base station, a system information block including information on the frequency band that supports the public safety network service, wherein the system information block includes a system information block 15, and
when a received call is received during the public safety network service, check a user setting, and control processing the received call, based on the user setting.

12. The terminal of claim 9, further comprising:
a touch screen,
wherein the controller is further configured to:
control the touch screen to display, a notification area for inquiring whether to transmit a message including the public safety network related information to the base station, and control the transceiver to transmit a message including the public safety network related information to the base station when a positive reply is received through the notification area, or
determine that the base station supports the public safety network service, and when the base station supports the public safety network service based on the information indicating that the base station supports a public safety network service, control the touch screen to display, notification information informing of support.

13. The terminal of claim 9, wherein the controller is further configured to:
check a current time; and
control the transceiver to transmit a message including the public safety network related information to the base station when the current time is contained in a specific time slot.

14. A base station for supporting a public safety network access of a terminal in a wireless communication system, the base station comprising:
a transceiver configured to transmit and receive a signal to and from the terminal; and a controller configured to control the transceiver to transmit, to a terminal during a random access procedure, information indicating that the base station supports a public safety network service, and receive, from the terminal, a message including terminal capability information indicating that the terminal supports a public safety network service, in case that execution of an application associated with the public safety network service is detected based on category information included in a packet of the application and the terminal is configured to notify that the terminal supports the public safety network service, to determine whether a serving frequency band of the terminal and a frequency band that supports the public safety network service are different, to determine, based on the message, to perform a hand over the terminal to a frequency band that supports the public safety network service in case that the terminal support the public safety network service and the serving frequency band of the terminal and the frequency band that supports the public safety network service are different, and to control the transceiver to transmit, to the terminal, a handover command to hand over the terminal to the frequency band that supports the public safety network service, based on the determination.

15. The base station of claim 14, wherein the controller is further configured to:
   in case that execution of the application associated with the public safety network service is detected at the terminal, control the transceiver to receive, from the terminal, an indication for requesting a handover to the frequency band that supports the public safety network service, and
   generate a system information block including information on the frequency band that supports the public safety network service, and control the transceiver to broadcast the generated system information block,
   wherein the system information block includes a system information block 15.

* * * * *